United States Patent
Alkalay et al.

(10) Patent No.: US 10,884,799 B2
(45) Date of Patent: Jan. 5, 2021

(54) MULTI-CORE PROCESSOR IN STORAGE SYSTEM EXECUTING DYNAMIC THREAD FOR INCREASED CORE AVAILABILITY

(71) Applicant: EMC IP Holding Company LLC, Hopkinton, MA (US)

(72) Inventors: Amitai Alkalay, Kadima (IL); Lior Kamran, Rishon LeZion (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 228 days.

(21) Appl. No.: 16/251,868

(22) Filed: Jan. 18, 2019

(65) Prior Publication Data

US 2020/0233705 A1    Jul. 23, 2020

(51) Int. Cl.
  *G06F 9/48*   (2006.01)
  *G06F 3/06*   (2006.01)

(52) U.S. Cl.
  CPC ............ *G06F 9/4881* (2013.01); *G06F 3/061* (2013.01); *G06F 3/0631* (2013.01); *G06F 3/0683* (2013.01)

(58) Field of Classification Search
  None
  See application file for complete search history.

(56) References Cited

U.S. PATENT DOCUMENTS

| | | |
|---|---|---|
| 7,444,464 B2 | 10/2008 | Urmston et al. |
| 8,095,726 B1 | 1/2012 | O'Connell et al. |
| 8,214,612 B1 | 7/2012 | Natanzon |
| 9,104,326 B2 | 8/2015 | Frank et al. |
| 9,208,162 B1 | 12/2015 | Hallak et al. |
| 9,286,003 B1 | 3/2016 | Hallak et al. |
| 9,552,258 B2 | 1/2017 | Hallak et al. |
| 9,606,870 B1 | 3/2017 | Meiri et al. |
| 9,716,754 B2 | 7/2017 | Swift |

(Continued)

FOREIGN PATENT DOCUMENTS

WO    2016111954 A1    7/2016

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Andrew M. Lyons
(74) *Attorney, Agent, or Firm* — Ryan, Mason & Lewis, LLP

(57) ABSTRACT

At least one processor of a storage system comprises a plurality of cores and is configured to execute a first thread in a plurality of modes of operation. When operating in a first mode of operation, the first thread polls at least one interface of the storage system for data to be processed. Responsive to detecting the data, the first thread processes the data. Responsive to having no remaining data to be processed, the first thread suspends execution on the first core if another thread is executing on a second core and operating in a second mode of operation. When operating in the second mode of operation, the first thread polls at least one interface associated with a second thread operating executing on a second core and operating in the first mode of operation for data to be processed. Responsive to detecting the data, the first thread causes the second thread to resume execution.

20 Claims, 7 Drawing Sheets

(56) References Cited

U.S. PATENT DOCUMENTS

| | | | |
|---|---|---|---|
| 10,289,306 B1* | 5/2019 | Feng | G06F 3/067 |
| 2008/0279462 A1 | 11/2008 | Celi, Jr. | |
| 2009/0132955 A1 | 5/2009 | Garg et al. | |
| 2010/0179941 A1 | 7/2010 | Agrawal et al. | |
| 2013/0325824 A1 | 12/2013 | Shoens | |
| 2014/0033217 A1* | 1/2014 | Vajda | G06F 9/30189 718/102 |
| 2014/0129784 A1* | 5/2014 | Chapman | G06F 9/542 711/154 |
| 2014/0181016 A1 | 6/2014 | Whitehead et al. | |
| 2016/0147534 A1* | 5/2016 | Lewis | G06F 9/3851 712/216 |
| 2016/0150012 A1 | 5/2016 | Barszczak et al. | |
| 2016/0170987 A1 | 6/2016 | Kesselman | |
| 2016/0202927 A1 | 7/2016 | Klarakis et al. | |
| 2016/0224259 A1 | 8/2016 | Ahrens et al. | |
| 2017/0134325 A1* | 5/2017 | Apfelbaum | H04L 47/70 |
| 2017/0192857 A1 | 7/2017 | Meiri et al. | |
| 2019/0171604 A1* | 6/2019 | Brewer | G06F 13/1684 |

OTHER PUBLICATIONS

EMC Corporation, "Unstoppable Data Reduction: Always-on, In-Line, Zero-Penalty, Enterprise-Class, Free," https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Y. Zhang et al., "End-to-End Integrity for File Systems: A ZFS Case Study," Proceedings of the 8th USENIX Conference on File and Storage Technologies (FAST), Feb. 23-26, 2010, 14 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

U.S. Appl. No. 16/162,471, filed Oct. 17, 2018 and entitled "Dynamic Multitasking for Distributed Storage Systems."

* cited by examiner

MULTI-CORE PROCESSOR IN STORAGE SYSTEM EXECUTING DYNAMIC THREAD FOR INCREASED CORE AVAILABILITY

FIELD

The field relates generally to information processing systems, and more particularly to storage in information processing systems.

BACKGROUND

Information processing systems utilize a variety of systems for implementing applications at the node level. For example, nodes of a distributed storage system may include multi-core processors that are configured to execute threads associated with applications. One or more cores of a given such multi-core processor may execute the threads associated with a particular application. In some instances, an application may utilize an always-polling model in which threads executing on one or more cores poll interfaces of the information processing system for new tasks, events, or other data. In other instances, an application may use an event driven model in which interrupts are used to activate threads for processing a task, event or other data using the one or more cores.

SUMMARY

Illustrative embodiments provide techniques for improved processor core control in a storage system, thereby increasing core availability.

For example, in one embodiment, a storage system comprises at least one processing device and a plurality of storage devices. The at least one processing device comprises a plurality of cores. The at least one processing device is configured to execute a first thread on a first core of the plurality cores. The first thread is configured to operate in a plurality of modes of operation.

The first thread, when operating in a first mode of the plurality of modes of operation, is configured to poll at least one interface of the storage system associated with the first thread for an indication of data to be processed by the first thread. Responsive to a detection of an indication of data to be processed by the first thread on the at least one interface associated with the first thread by the polling of the first thread, the first thread is further configured to process the data based on the indication. Responsive to the first thread having no remaining data to be processed, the first thread is further configured to suspend execution on the first core if another thread of the plurality of threads is executing on another core of the plurality of cores and operating in a second mode of the plurality of modes of operation.

The first thread, when operating in the second mode of operation, is configured to poll at least one interface of the storage system associated with a second thread operating in the first mode of operation and executing on a second core of the plurality of cores for an indication of data to be processed by the second thread. Responsive to a detection of an indication of data to be processed by the second thread on the at least one interface associated with the second thread by the polling of the first thread, the first thread is further configured to cause the second thread to resume execution on the second core.

The first thread, when operating in a third mode of the plurality of modes of operation, is configured to enter a disabled state in which processing resources of the first core are not utilized by the first thread and are available for use by another thread executing on the first core.

In some embodiments, the at least one processing device is configured to execute a plurality of threads on the plurality of cores. Each of the plurality of threads executes on a respective core of the plurality of cores. The plurality of threads comprise the first thread executing on the first core and the second thread executing on the second core. Each of the plurality of threads is configured to operate in the plurality of modes of operation including at least the first mode of operation and the second mode of operation.

In further embodiments, in conjunction with each of the plurality of threads operating in the first mode of operation, the at least one processing device is configured to determine whether or not the plurality of threads are utilizing the processing resources of their respective cores below a pre-determined threshold of utilization. In response to determining that the plurality of threads are utilizing the processing resources of their respective cores below the pre-determined threshold of utilization, the at least one processing device is configured to dynamically change the mode of operation of a given thread of the plurality of threads from the first mode of operation to the second mode of operation.

In yet other further embodiments, in conjunction with a given thread of the plurality of threads operating in the second mode of operation and at least one other thread of the plurality of threads operating in the first mode of operation, the at least one processing device is configured to determine whether or not the at least one other thread is utilizing the processing resources of its respective core above a pre-determined threshold of utilization. In response to determining that the at least one other thread is utilizing the processing resources of its respective core above the pre-determined threshold of utilization, the at least one processing device is configured to dynamically change the mode of operation of the given thread from the second mode of operation to the first mode of operation.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
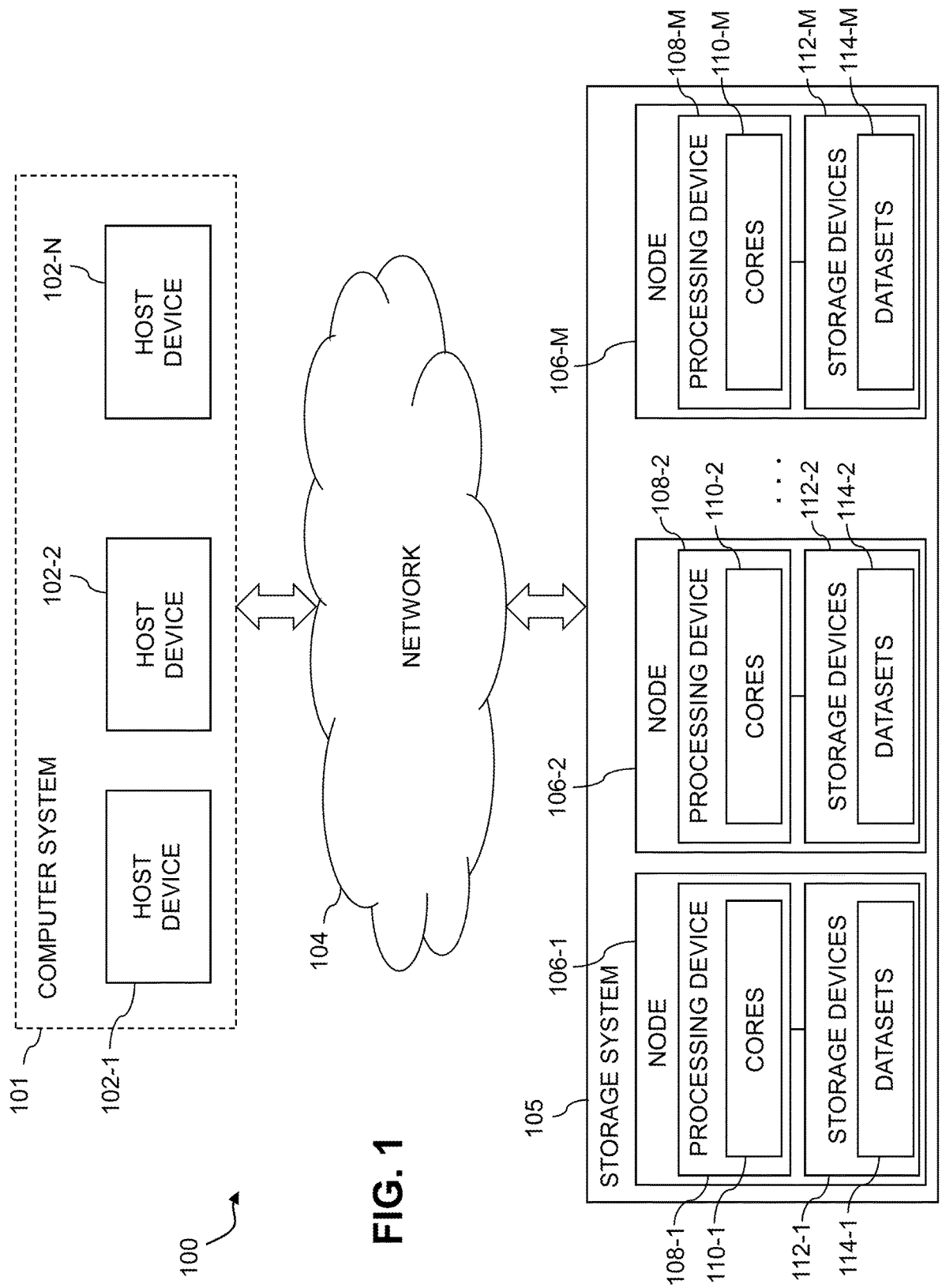
FIG. 1 is a block diagram of an information processing system comprising a storage system configured with dynamic truck thread functionality in an illustrative embodiment.

FIG. 1 shows an information processing system 100 configured in accordance with an illustrative embodiment. The information processing system 100 comprises a computer system 101 that includes host devices 102-1, 102-2, . . . 102-N. The host devices 102 communicate over a network 104 with a storage system 105. The computer system 101 is assumed to comprise an enterprise computer system, cloud-based computer system or other arrangement of multiple compute nodes associated with respective users. The host devices 102 of the computer system 101 in some embodiments illustratively provide compute services such as execution of one or more applications on behalf of each of one or more users associated with respective ones of the host devices 102.

The host devices 102 and storage system 105 illustratively comprise respective processing devices of one or more processing platforms. For example, the host devices 102 and the storage system 105 can each comprise one or more processing devices each having a processor and a memory, possibly implementing virtual machines and/or containers, although numerous other configurations are possible.

The host devices 102 and the storage system 105 can additionally or alternatively be part of cloud infrastructure such as an Amazon Web Services (AWS) system. Other examples of cloud-based systems that can be used to provide one or more of host devices 102 and storage system 105 include Google Cloud Platform (GCP) and Microsoft Azure.

The host devices 102 and the storage system 105 may be implemented on a common processing platform, or on separate processing platforms.

The host devices 102 are configured to write data to and read data from the storage system 105 in accordance with applications executing on those host devices 102 for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 105 is accessible to the host devices 102 over the network 104. The storage system 105 comprises a plurality of nodes 106-1, 106-2, . . . 106-M, also referred to herein as nodes 106. In some embodiments, for example, the storage system 105 may be a distributed storage system comprising a plurality of nodes 106.

Each node 106 comprises at least one processing device 108-1, 108-2, . . . 108-M, also referred to herein as processing devices 108. For example, a given node 106 may comprise a single processing device 108 or more than one processing device 108. In some embodiments, multiple processing devices 108 of a node 106 may act or function as a single processing device 108.

Processing devices 108-1, 108-2, . . . 108-M comprise respective sets of cores 110-1, 110-2, . . . 110-M, referred to herein as cores 110. For example, a given processing device 108 may comprise a set of two cores, four cores, eight cores, or any other number of cores.

Each node 106-1, 106-2, . . . 106-M also comprises a set of associated storage devices 112-1, 112-2, . . . 112-M, referred to herein as storage devices 112. For example, a given node 106 may comprise one storage device 112, two storage devices 112, four storage devices 112, eight storage devices 112, sixteen storage devices 112, thirty-two storage devices 112 or any other number of storage devices 112. The storage devices 112 store datasets 114-1, 114-2, . . . 114-M, referred to herein as datasets 114, which may comprise logical storage volumes, snapshots or other arrangements of data.

The storage devices 112 illustratively comprise solid state drives (SSDs). Such SSDs are implemented using non-volatile memory (NVM) devices such as flash memory. Other types of NVM devices that can be used to implement at least a portion of the storage devices 112 include non-volatile random-access memory (NVRAM), phase-change RAM (PC-RAM) and magnetic RAM (MRAM). These and various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the storage system 105 illustratively comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement storage system 105 in other embodiments.

The term "storage system" as used herein is therefore intended to be broadly construed and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage system 105 in illustrative embodiments include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The storage system 105 should also be understood to include additional modules and other components typically found in conventional implementations of storage systems, although such additional modules and other components are omitted from the figure for clarity and simplicity of illustration.

The host devices 102 and the storage system 105 may be implemented on respective distinct processing platforms, although numerous other arrangements are possible. For example, in some embodiments at least portions of the host devices 102 and the storage system 105 are implemented on the same processing platform. The storage system 105 can therefore be implemented at least in part within at least one processing platform that implements at least a portion of the host devices 102. In illustrative embodiments storage system 105 may be implemented as a distributed storage system 105 comprising a plurality of nodes 106 that may be logically or physically distributed.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 102 and storage system 105 to reside in different data centers. Numerous other distributed implementations of one or both of the host devices 102 and the storage system 105 are possible. Accordingly, the storage system 105 can also be implemented in a distributed manner across multiple data centers.

Additional examples of processing platforms utilized to implement host devices and/or storage systems in illustrative embodiments will be described in more detail below in conjunction with FIGS. 5-7.

It is to be appreciated that these and other features of illustrative embodiments are presented by way of example only and should not be construed as limiting in any way.

Accordingly, different numbers, types and arrangements of system components such as host devices 102, network 104, storage system 105, nodes 106, processing devices 108, cores 110, storage devices 112, and datasets 114 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

In some embodiments, an information processing system implements applications by executing threads on one or more cores of one or more processors. In an example, a distributed storage system of the information processing system may comprise a plurality of nodes that are connected together via a full-mesh network and managed by a system manager. Each node comprises at least one multi-core processor that implements applications by executing threads. For example, in the case of a block application, which handles the block-based functionality of the storage system, the block application may execute operating system (OS)-threads (described herein in some embodiments as a truck threads or trucks) on one or more cores of the multi-core processor. These truck threads implement the block application functionality. In some embodiments, each truck thread may be hard affined to a particular core, i.e., may only execute on that particular core.

As part of its operation, each truck thread polls a corresponding set of interfaces of the storage system for tasks, events, or other data to be processed by the truck thread. For example, the set of interfaces may include an interface for indications of completions of submitted IO requests to the disk array, an interface for IO requests from the user, and interfaces for other tasks, events, or other data. Any other interfaces may also be polled. Each truck thread, by design, fully utilizes the processor core that it is executing on for both interface polling and processing of the corresponding tasks, events, or other data. For example, in illustrative embodiments, each truck thread is designed to fully utilize the processor core that it is executing on because, even when there is no actual processing of tasks to be performed, the truck thread continues checking its respective interfaces via polling. This design is optimized for a storage system that requires low latency and high input-output operations per second (IOPS) since no context switches or interrupts are required to perform the processing. In some embodiments, the functionality of the block application may be described as an always-polling model.

In some embodiments, example interfaces that may be polled by a truck thread may include a front-end interface, a remote procedure call (RPC) messaging interface, a remote direct memory access (RDMA) messaging interface, and a back-end interface. In some embodiments, any other interface commonly used in a storage system may also be polled by the truck thread. In some embodiments, each truck thread defines an IO-provider instance for each corresponding interface that it is responsible for polling.

The front-end interface comprises an interface for receiving (and replying to) IO requests from a user of the storage system, e.g. via a host device 102. For example, a given truck thread may comprise a front-end IO-provider instance that polls for new IO requests from a host device 102 or another user. In some embodiments, for example, IO requests received by the storage system 105 from the user are pooled together in a common pool that is shared between the truck threads and accessed using a front-end IO-provider instance.

The RPC messaging interface comprises an interface for sending and receiving messages to and from other nodes. For example, a given truck thread may comprise an RPC messaging IO-provider that polls for new messages from other nodes in the system. As an example, when a node sends an IO request to another node, the sender node selects the specific destination truck thread, e.g., the truck thread that will receive and handle the request.

The RDMA messaging interface comprises an interface for RDMA transfer of buffers between nodes. For example, a given truck thread may comprise an RDMA messaging IO-provider that polls for the completion of RDMA transfers between nodes.

The back-end interface comprises an interface for accessing the storage devices 112, e.g., to read and write IOs to a disk array. For example, a given truck thread may comprise a back-end IO-provider that polls for the completion of read and write requests initiated by the truck thread to the disk array.

In some cases, the storage system may also implement one or more other applications aside from the block application. For example, a file application that provides a file interface to a user of the information processing system may also be implemented by the storage system, for example, by executing a thread on one or more of the cores. In some cases, the block application and the file application, or any other application, may be implemented by the storage system simultaneously, each with a different load that can dynamically change over time.

Since these applications are attempting to utilize the same set of processor cores simultaneously, management of the available processing resource of these cores between the applications may become troublesome. For example, since the block application is implemented by executing truck threads on each processor core of a node, and these truck threads can utilize the full capacity of those cores, little to no processing resources may be available for use by threads of another application.

In an example, if only the file application is actively in use, e.g., no tasks, events, or other data are present for the truck threads to process, the associated file threads may only be able to utilize a portion of the processing resources of a core, e.g., 50% or another percentage, where the remaining portion, e.g., the other 50% or another percentage, will be used by the truck threads just for polling interfaces. In cases where the block application is actively performing operations, the truck threads will utilize a substantial portion of the processing resources of the cores, e.g., 90%, 95%, or even 100%, to both poll the interfaces and process any tasks, events, or other data found on those interfaces during the polling which leaves little to no processing resources available on those cores for use by other applications such as a file application.

An example storage system that allows the full processing resources of a core to be available for use by other applications even when a truck thread of a block application is utilizing that core to support its functionality is disclosed in co-pending U.S. patent application Ser. No. 16/251,779 entitled "MULTI-CORE PROCESSOR IN STORAGE SYSTEM EXECUTING DEDICATED POLLING THREAD FOR INCREASED CORE AVAILABILITY," filed concurrently herewith, the entirety of which is incorporated herein by reference.

Co-pending U.S. patent application Ser. No. 16/251,779 discloses a storage system that is able to dynamically adapt to the user operation pattern of multiple simultaneously implemented applications where, for example, one of the applications executes an always-polling model of functionality that consumes significant processing resources using the above described truck threads. Co-pending U.S. patent application Ser. No. 16/251,779 discloses a technique for creating an event driven storage system out of the always-polling model through the use of a dedicated peek-poller thread. The dedicated peek-poller thread serves as a mechanism to allow for the sharing of the full resources of the other cores in a processing device between the two or more applications in a manner that dynamically matches the user operation pattern. For example, the dedicated peek-poller thread is executed on a core of the processing device and partially replaces the polling functionality of each of the truck threads executing on the other cores in the processing device, thereby freeing up the processing resources of those other cores that would otherwise be used by the truck threads for polling for use by other applications during times when the block application is experiencing reduced activity.

However, a situation may arise where, for example, the block application is utilizing the full resources of the processing device cores such that having a dedicated peek-poller thread executing on one of the cores reduces the total amount of processing resources available to the block application. For example, if there are ten cores available on the processing device, and one of the cores is executing a dedicated peek-poller thread, only nine of the cores or 90% of the processing resources of the processing device are available for use by the block application.

In illustrative embodiments, the techniques disclosed herein introduce dynamic truck threads that may be executed on the cores of a processing device. The function of each of the dynamic truck threads is modifiable between multiple operating modes such that the full processing resources of the all of the cores of a processing device are available for use by a block application during periods of time when the block application is exhibiting high levels of core utilization while the processing resources of the cores are also available for other applications during periods of time when the block application is exhibiting moderate to low levels of core utilization. For example, in such embodiments, the function of a given dynamic truck thread is dynamically modifiable between an operating mode where the given dynamic truck thread performs the above described truck thread functionality and an operating mode where the given dynamic truck thread performs at least some of the above described peek-poller thread functionality as will be described in more detail below. In some embodiments, the functionality of each of the dynamic truck threads may also be modified to an operating mode where all functions of the dynamic truck threads are disabled on the cores of the processing device such that the processing resources of the cores are fully available for use by other applications.

Figure 2:
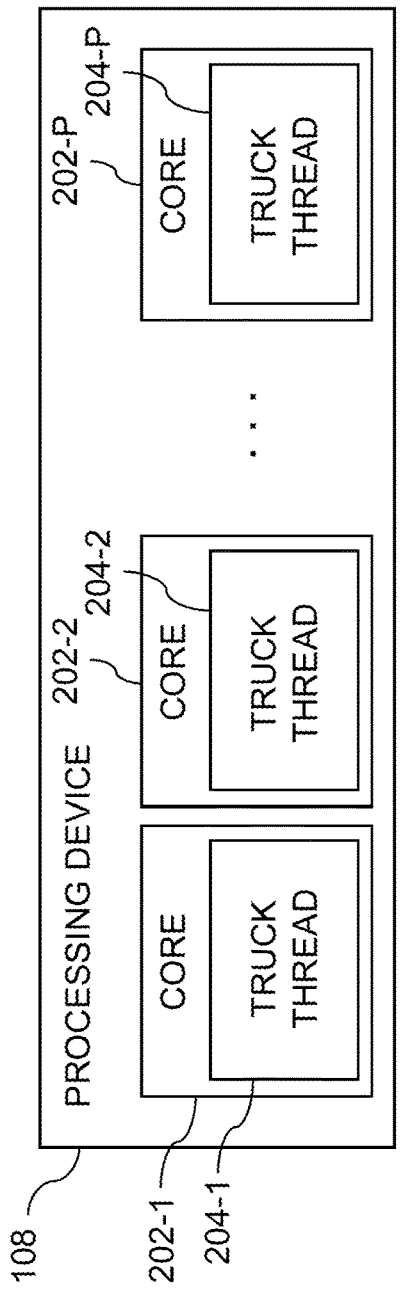
FIG. 2 is a block diagram of a processing device of the information processing system of FIG. 1 comprising a plurality of cores executing truck thread functionality in an illustrative embodiment.

With reference now to FIG. 2, a given processing device 108 comprises a set of cores 110 (FIG. 1), e.g., cores 202-1, 202-2, ... 202-P, referred to herein as cores 202, that execute threads of one or more applications. For example, in some embodiments, a block application is implemented by executing a respective truck thread on one or more of the cores 202 and in some embodiments on each core 202. For example, as illustrated in FIG. 2, a respective truck thread 204-1, 204-2, ... 204-P may be executed on each core 202 of the given processing device 108 to implement at least a portion of the block application. As described above, by executing a truck thread 204 on a given core 202, a significant portion of the processing resources of that given core 202 is utilized for polling the interfaces associated with that truck thread 204, and processing associated tasks, events or other data found on those interfaces, leaving little to no processing resources available on that core for executing the threads of other applications.

Figure 3:
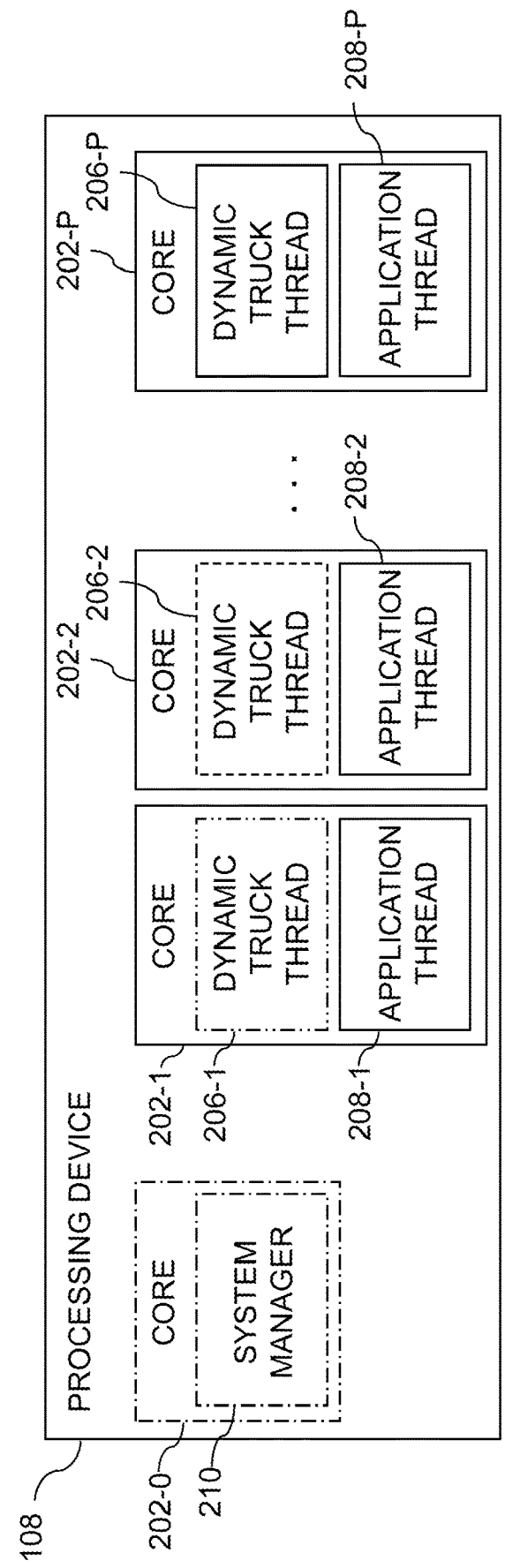
FIG. 3 is a block diagram of the processing device of FIG. 2 with the plurality of cores executing dynamic truck thread functionality in an illustrative embodiment.

With reference now to FIG. 3, illustrative embodiments introduce the use of dynamic truck threads 206-1 through 206-P, referred to herein as dynamic truck threads 206, executing on respective cores 202, e.g., on respective cores 202-1 through 202-P, as illustrated in FIG. 3.

In illustrative embodiments, the function of each dynamic truck thread 206 is adjustable between a plurality of modes of operation. For example, in some embodiments, one or more of the dynamic truck threads 206 may operate in a first mode of operation, e.g., a mode of operation that implements block functionality such as that described above for the truck threads, a second mode of operation, e.g., implement at least some of the functionality of a peek-poller thread as described in co-pending U.S. patent application Ser. No. 16/251,779, and a third mode of operation, e.g., a disabled mode in which the dynamic truck thread 206 does not utilize processing resources of the corresponding core 202.

With continued reference to FIG. 3, in some embodiments, storage system 105 may implement a system manager 210 that is configured manage the modes in which the dynamic truck threads 206 execute on the cores 202. In illustrative embodiments, system manager 210 executes on one or more cores 202 of a processing device 108, e.g., a core 202-0. In some embodiments, each node 106 may implement a separate system manager 210 on one or more of the cores 202 of its processing device 108.

In some embodiments, storage system 105 may implement a single system manager 210 that executes on one or more cores 202 of the processing device 108 of a particular node 106 but manages the modes in which the dynamic truck threads 206 execute both on the other cores 202 of that processing device 108 and on processing devices 108 of other nodes 106 of the storage system 105. For example, the core 202-0 that executes system manager 210 is depicted in FIG. 3 with dashed and dotted lines, indicating that core 202-0 and system manager 210 may or may not be executing in the processing device 108 of a given node 106.

In some embodiments, storage system 105 may comprise a separate processing device that executes the system manager 210 and manages the dynamic truck threads 206 executing on the cores 202 of the processing devices 108 of each of the nodes 106. In some embodiments, the execution and implementation of system manager 210 may be distributed across multiple cores 202, processing devices 108, or nodes 106.

A dynamic truck thread 206 operating in the first mode of operation is responsible for polling each of its corresponding interfaces for new tasks, events, or other data, fetching any new tasks, events, or other data that are detected on the corresponding interfaces, and processing the fetched tasks, events, or other data, for example, as described above for the truck threads.

A dynamic truck thread 206 operating in the second mode of operation is responsible for polling all of the interfaces associated with each dynamic truck thread 206 that is operating in the first mode of operation on the cores 202 of the given processing device 108. Because the dynamic truck thread 206 operating in the second mode of operation performs the polling functionality for each dynamic truck thread 206 that is operating in the first mode of operation, each dynamic truck thread 206 that is operating in the first mode of operation no longer needs to perform this polling functionality. For example, instead of polling a respective set of interfaces for new tasks, events, or other data, a given dynamic truck thread 206 operating in the first mode of operation may give up execution on its core 202 and wait for the dynamic truck thread 206 that is operating in the second mode of operation to detect new tasks, events, or other data on that set of interfaces. For example, the given dynamic truck thread 206 may give up execution by suspending itself or entering a suspended or waiting state in which the given dynamic truck thread 206 waits to be woken up by another portion of the processing device 108 such as, e.g., the dynamic truck thread 206 that is operating in the second mode of operation, e.g., implementing at least some of the above described peek-poller thread functionality.

In some embodiments, the dynamic truck thread 206 operating in the first mode of operation may only give up execution and enter the suspended state when at least one of the other dynamic truck threads 206 is operating in the second mode of operation. If no dynamic truck thread 206 is operating in the second mode of operation on a given processing device 108, the dynamic truck threads 206 that are operating in the first mode of operation may continue executing on their respective cores 202 even when no tasks, events, or other data currently require processing instead of entering the suspended state.

While in the suspended state, the given dynamic truck thread 206 does not utilize the resources of its core 202, leaving these resources available for use by another application thread such as, e.g., one of application threads 208-1 through 208-P, referred to herein as application threads 208.

In some embodiments, any number of application threads 208 may execute on a given core 202. Application threads 208 may for example, comprise threads associated with an application such as the file application mentioned above or any other application that utilizes the cores 202 of a node 106 of the storage system 105.

As illustrated in the example of FIG. 3, a dynamic truck thread 206-1 operating in the second mode of operation on core 202-1, e.g., as denoted by the double dotted and dashed lines, may fully utilize the core 202-1 and leave little or no processing resources available for use by an application thread 208-1. In another example, a dynamic truck thread 206-2 operating in the first mode of operation on core 202-2 may be in the suspended state, as denoted by the dashed lines, and an application thread 208-2 may execute on core 202-2 and utilize the full processing resources of core 202-2. As another example, a dynamic truck thread 206-P operating in the first mode of operation on core 202-P may be utilizing the processing resources of core 202-P while an application thread 208-P also attempts to execute on core 202-P where, for example, application thread 208-P may only be able to utilize any processing resources of core 202-P that are currently unused by the truck thread 206-P, e.g., less than 50% of the processing resources or even no processing resources.

When a dynamic truck thread 206 operating in the second mode of operation detects a new task, event or other data on an interface associated with a given dynamic truck thread 206 operating in the first mode of operation on one of the other cores 202 of the processing device 108, the dynamic truck thread 206 operating in the second mode of operation wakes up the given dynamic truck thread 206, if the given dynamic truck thread 206 is in the suspended state. For example, the dynamic truck thread 206 operating in the second mode of operation may cause the processing device 108 to wake up the given dynamic truck thread 206 or resume execution of the given dynamic truck thread 206 that is operating in the first mode of operation on the corresponding core 202. Once awoken, the given dynamic truck thread 206 resumes execution of its normal flow of functionality in the first mode of operation on the corresponding core 202, e.g., polling each of its interfaces for new tasks, events, or other data, fetching and processing any new tasks, events, or other data that are detected, and taking any other actions according to its functionality.

When in the second mode of operation, a dynamic truck thread 206 has as fast a polling cycle as possible so that it can detect new tasks, events, or other data on the interfaces associated with the dynamic truck threads 206 operating in the first mode of operation as soon as they arrive and wake up the corresponding dynamic truck threads 206. For example, in some embodiments, the dynamic truck thread 206 operating in the second mode of operation may poll for ready tasks, events, or other data in each of the interfaces associated with any dynamic truck threads 206 operating in the first mode of operation, but it does not perform fetching or other similar operations on those ready tasks, events, or other data or otherwise process the ready tasks, events, or other data in a manner that a truck thread would. This allows the dynamic truck thread 206 operating in the second mode of operation to quickly and efficiently detect new tasks, events, or other data on the interfaces without being bogged down by the associated fetching and processing that is performed by the dynamic truck threads 206 operating in the first mode of operation.

After the dynamic truck thread 206 operating in the second mode of operation wakes up a given dynamic truck thread 206 operating in the first mode of operation, e.g., in response to detecting a new task, event or other data on one of the interfaces corresponding to the given dynamic truck thread 206, the given dynamic truck thread 206 resumes its normal flow of execution. For example, the given dynamic truck thread 206 polls its corresponding interfaces, including any interfaces on which the dynamic truck thread 206 operating in the second mode of operation detected a new task, event or other data, fetches any new tasks, events, or other data that it finds on the interfaces, and processes all of the work corresponding to the fetched tasks, events, or other data.

When all in-flight operations of the given dynamic truck thread 206 operating in the first mode of operation are in a waiting state, e.g. waiting for an indication of a completion of a pending IO operation from a storage device 112, waiting for an indication of a completion of an RDMA transfer from another node 106, etc., the given dynamic truck thread 206 will release the resources of the core 202 by entering the suspended or sleep state. As mentioned above, in illustrative embodiments, the given dynamic truck threads 206 will only release the resources of the core 202 and enter the suspended or sleep state if at least one other dynamic truck thread 206 is operating in the second mode of operation.

In some embodiments, when a dynamic truck thread 206 operating in the first mode of operation polls its corresponding interfaces and no new tasks, events, or other data are present, the dynamic truck thread 206 will also release the resources of the core 202 by entering the suspended or sleep state provided that no previously received tasks are currently being processed by the thread. For example, while the dynamic truck thread 206 is processing tasks, events, or other data, the dynamic truck thread 206 may also be constantly polling for new tasks, events, or other data on its interfaces during its normal operational flow. If these interfaces do not contain any new tasks, events, or other data, the dynamic truck thread 206 may release the resources of the core 202 and enter the suspended or sleep state.

By entering a suspended or sleep state, a given dynamic truck thread 206 allows any other application thread that is executing on that core 202 to utilize the released resources for its own execution until the dynamic truck thread 206 operating in the second mode of operation detects new activity on the corresponding interfaces and wakes up the given dynamic truck thread 206 again.

By operating at least one dynamic truck thread 206 in the second mode of operation, the life cycle of a given dynamic truck thread 206 operating in the first mode of operation becomes a combination of an event driven model (via the dynamic truck thread 206 operating in the second mode of operation) and a polling model because after the given dynamic truck thread 206 is woken up by the dynamic truck thread 206 operating in the second mode of operation in response to the detection of a new task, event or other data on a corresponding interface, it resumes its normal operation of polling until it releases the core again.

In some embodiments, the operating system of the processing device 108 is configured to not preempt a dynamic truck thread 206 executing on one of its cores 202 in favor of another application thread 208 such that the dynamic truck thread 206 will continue to run until it voluntarily yields the core 202, e.g., by voluntarily entering a suspended or waiting state, even if another application thread 208 is ready to execute on that core 202. In contrast, while the operating system will not preempt an executing dynamic truck thread 206 for another application thread 208, when a suspended dynamic truck thread 206 becomes ready to run in response to the dynamic truck thread 206 operating in the second mode of operation waking it up, the operating system in such embodiments may be configured to preempt any other application threads 208 executing on the core 202 and schedule the ready dynamic truck thread 206 for immediate execution.

In order to ensure such requirements in these embodiments, the operating system (OS) scheduling policy of the block application may, for example, be configured to the highest possible OS scheduling priority that will not be preempted by other applications, e.g., by a context-switch or other similar action. This ensures that the processing resources of the core will be available to the other applications only when the block application voluntarily releases the core. This configuration guarantees that the operating system will let a ready dynamic truck thread 206 run until it voluntarily releases the core 202. Likewise, a dynamic truck thread 206 that executes in the second mode of operation will have priority over any other applications 208 attempting to execute on the corresponding core 202.

A dynamic truck thread 206 operating in the third mode of operation, e.g., a disabled mode, does not utilize any processing resources of the respective core 202, leaving them available for use by other applications 208. For example, in illustrative embodiments, each of the dynamic truck threads 206 may operate in the third mode of operation in response to a command or indication received from the system manager 210 that indicates that the block application will not actively utilize the cores 202 of the processing device 108 and that another application will instead utilize the cores 202 of the processing device 108. In some embodiments, the system manager 210 may receive a command or other indication from a host device 102 that the processing device 108 will be used for the other application and not the block application.

When the system manager 210 commands a given dynamic truck thread 206 to operate in the third mode of operation, e.g., the disabled mode, the following actions may occur.

The system manager 210 sends a command to all nodes 106 that are associated with or communicating with the given dynamic truck tread 206 instructing the nodes 106 to stop sending new IO requests to the given dynamic truck thread 206. This may be considered a stopping of all internal IO requests for the given dynamic truck thread 206, e.g., IO requests originating from other nodes 106.

The system manager 210 sends a command to the given dynamic truck thread 206 that instructs it to stop the front-end IO-provider interface from pulling new IO requests from the common pool of IO requests. Any other dynamic truck threads 206 that are still operating in the first mode of operation continue to pull IO requests from the same common pool, so IO requests are still being serviced. This may be considered a stopping of all external IO requests for the given dynamic truck thread 206, e.g., IO requests originating from a host device 102.

Any in-flight IO requests being processed by the given dynamic truck thread 106 are allowed to complete. After all in-flight IO requests are completed, the corresponding core 202 for the given dynamic truck thread 206 is considered to be IO free, e.g., no more IO requests are being processed by that core 202. However, the given dynamic truck thread 206 is still consuming processing resources of the corresponding core 202 due to the execution of background operations and the IO-provider interfaces. The system manager 210 sends a command to the given dynamic truck thread 206 instructing it to stop all background processes such that the given dynamic truck thread 206 is no longer initiating any IO requests to the disks and no messages are sent to it.

The system manager 210 next sends a command to the given dynamic truck thread 206 instructing it to stop all IO-provider interfaces from polling. The given dynamic truck thread 206 is now considered to be in a disabled state where the given dynamic truck thread 206 does not utilize any resources on its corresponding core 202. The core 202 is now available for full use by another application, e.g., via the execution of an application thread 208 on the corresponding core 202.

The dynamic truck thread 206 may be re-enabled by performing the above operations in reverse order. For example, the system manager 210 may send a command to the dynamic truck thread 206 instructing it to resume all IO-providers interfaces, may send a command to the dynamic truck thread 206 instructing it to resume all background processes, may send a command to dynamic truck thread 206 instructing the front-end IO provider interface to resume pulling IO requests from the common pool of IO requests, and may send a command to any nodes associated with the dynamic truck thread 206 to resume sending new IO requests to dynamic truck threads 206. Another example technique for disabling and re-enabling a thread may be found in U.S. patent application Ser. No. 16/162,471, (now U.S. Pat. No. 10,474,496), entitled "DYNAMIC MULTI-TASKING FOR DISTRIBUTED STORAGE SYSTEMS," filed on Oct. 17, 2018, the entire content of which is incorporated herein by reference.

In some embodiments, the system manager 210 may command all cores 202 on a processing device 108 of a node 106 to operate in the third mode of operation, thereby freeing up the entire processing device 108 (except for a core executing the system manager 210, if present) for use by the other application. For example, where a user of the system knows that the block application will not be executing on the processing device 108 and desires to utilize as many processing resources of the processing device 108 as possible for the execution of another application, the user may command the system manager 210, e.g., via a host device 102, to change the execution of the dynamic truck threads 206 executing on the cores 202 of that processing device 108 from the first or second mode of operation to the third mode of operation, thereby disabling the execution of the block application in favor of the execution of the other application.

In some embodiments, system manager 210 may command only a subset of the cores 202 to operate in the third mode of operation. For example, where another application only requires a single core 202 for execution, system manager 210 may command only one core 202 to operate in the third mode of operation, thereby providing the processing resources of that core 202 to that application while maintaining the availability of the remaining cores 202 for use by the block application or other applications, e.g., by dynamically switching dynamic truck threads 206 executing on those remaining cores 202 between the first and second modes of operation as needed.

The process of enabling or disabling a given dynamic truck thread 206 by commanding it to operate in the third mode of operation or change from operating in the third mode of operation to another mode of operation may require substantial wasted resources and time, e.g., to shut down or restart all of the IO interfaces, background processes, etc. For this reason, the third mode of execution is, for example, ideally used when the block application is not intended to be actively running on the processing device. In situations where the block application may become active at any time, or may exhibit a low level of activity, execution of a dynamic truck thread 206 in the second mode of operation provides significant benefits in terms of flexibility and the ability to quickly switch between servicing the block application and another application while saving on the processing resources required to shut down or restart any IO interfaces or other processes every time the application usage requirements change.

In a first example scenario, a processing device 108 having ten cores 202 and executing dynamic truck threads 206 on each core 202 in the first mode of operation has limited processing resources available for use by the threads of other applications even when the block application is operating at a minimal level of utilization. For example, if the polling performed by the dynamic truck threads 206 operating in the first mode of operation requires 50% of the processing resources of their respective cores 202, another application may at best be able to utilize the remaining 50% of the processing resources of those cores 202 even when the block application has minimal utilization. On the other hand, in the first example scenario, the block application is able to utilize the full 100% of the processing resources of the processing device 108 when the block application has a maximal utilization which may be beneficial when the block application is operating at a high or maximal level of utilization.

In a second example scenario, a processing device 108 comprising ten cores 202 that operates dynamic truck threads 206 in the first mode of operation on nine of the cores 202 and operates a dynamic truck thread 206 in the second mode of operation on the tenth core 202 provides a significant boost in the available processing resources for another application when the block application is operating at a minimal level of utilization. For example, while the dynamic truck thread 206 operating in the second mode of operation utilizes 100% of its core 202, the remaining dynamic truck threads 206 operating in the first mode of operation utilize little to no resources of their respective cores 202 while waiting to be woken up by the dynamic truck thread 206 operating in the second mode of operation. Because of this, 90% of the processing resources of the processing device 108, e.g., nine out of ten cores 202, are available for use by the application threads 208 of the other application when the block application has minimal utilization. On the other hand, in the second example scenario, when the block application has maximal utilization, it may at best utilize 90% of the processing resources of the processing device 108, e.g., nine out of ten cores 202, since 100% of one of its cores 202 is being utilized by the dynamic truck thread 206 operating in the second mode of operation, which performs at least some of the above described peek-poller thread functionality.

In a third example scenario, a processing device 108 having ten cores 202 and operating dynamic truck threads 206 on each core in the third mode of operation, e.g., disabling the dynamic truck threads 206, allows most or all of the processing resources of the processing device 108 to be available for use by the threads of other applications. For example, in some cases, 100%, or close to it, of the processing resources of the processing device 108, e.g., all ten cores 202, may be available for use by the other application when the dynamic truck threads 206 of that processing device 108 operate in the third mode of operation. On the other hand, since the dynamic truck threads 206 are disabled in the third example scenario, the block application may not utilize any of the processing resources of the processing device 108 in this example scenario.

In illustrative embodiments, the execution mode of the dynamic truck threads 206 may be dynamically changed depending on the requirements of the system, especially in edge scenarios such as, e.g., minimal or maximal utilization of the processing resources by the block application, which improves utilization of the cores 202 by adjusting to the dynamic truck threads 206 to meet the characteristics of the applications and their respective loads on the system.

For example, to allow full utilization of the processing device 108 by the block application, all the dynamic truck threads 206 ideally will operate in the first mode of operation, e.g., the first example scenario above. On the other hand, to allow full utilization of the processing device 108 by another application, all of the dynamic truck threads 206 will ideally operate in the third mode of operation, e.g., the third example scenario above. In a mixed scenario, e.g., the second example scenario above, where both the block application and the other application are sharing utilization of the processing device 108, a dynamic truck thread 206 will ideally operate in the second mode of operation, e.g., perform at least some of the above described peek-poller thread functionality, and all other dynamic truck threads 206 will operate in the first mode of operation, with the caveat that they will suspend operation while waiting for the dynamic truck thread 206 operating in the second mode of operation to wake them up instead of continuously polling their respective interfaces.

In illustrative embodiments, the system manager 210 may monitor the core utilization of a processing device 108 and may dynamically control and change the modes in which the dynamic truck threads 206 operate to adapt the system to actual usage patterns.

For example, while in the mixed scenario, e.g., the second example scenario mentioned above, the system manager 210 may determine that the dynamic truck threads 206 of the block application that are operating in the first mode of operation are utilizing almost all core cycles of their respective cores 202, which means there are almost no core cycles available for use by application threads 208 that are also executing on those cores 202. In response to such a determination, the system manager 210 may command the dynamic truck thread 206 that is operating in the second mode of operation to instead operate in the first mode of operation. This dynamic change improves the utilization of the processing resources of the processing device 108 by the block application from about 90% to about 100%, e.g., from nine cores to ten cores in the above second example scenario, which will improve the system performance of the block application, at a cost to the performance of the other application that is executing application threads 208 on the cores 202. As part of this command, the system manager 210 may also indicate to the remaining dynamic truck threads 206 that are operating in the first mode of operation that no dynamic truck threads 206 are now operating in the second mode of operation. In response to the indication, the dynamic truck threads 206 no longer suspend themselves when no processing is actively occurring and instead continue polling their interfaces for new tasks, events, or other data.

In some embodiments, for example, the system manager 210 may monitor the utilization level of the processing device 108 as a whole, e.g., 80% utilization, 90% utilization, or another value, and may determine whether or not to change the dynamic truck thread 206 from execution in the second mode of operation to execution to the first mode of operation in response to the percentage of utilization exceeding a predetermined threshold value, e.g., 80%, 85%, or another value. In some embodiments, the system manager 210 may monitor the individual utilization of each core 202 of the processing device 108 and may make the determination based on the individual utilization levels of each core 202 that is operating a dynamic truck thread 206 in the first mode of operation exceeding the predetermined threshold. In some embodiments an average amount of utilization of the cores may also be determined and compared to the predetermined threshold to determine whether the predetermine threshold is met. It is important to note that, in some embodiments, each core 202 operating a dynamic truck thread 206 in the first mode of operation will have approximately the same level of utilization, e.g., be balanced, since all of the dynamic truck threads 206 pull from the same common pool of IO requests. Accordingly, in some embodiments the system manager 210 may only need to monitor one of the cores 202 to determine whether or not the utilization of the processing device 108 is above the predetermined threshold.

In another example, when the dynamic truck threads 206 are operating in the first mode of operation on all of the cores 202 of the processing device 108, the system manager 210 may determine whether or not the utilization of the cores 202 by the dynamic truck threads 206 is below a predetermined threshold. For example, if the dynamic truck threads 206 are utilizing the cores 202 below a predetermined threshold, e.g., 75%, 70%, 60%, or another value, this may be an indication that the block application has low to moderate activity on the processing device 108 which means there are core cycles available for use by other application threads 208 that are also executing on those cores 202.

In some embodiments, the application threads 208 may simply utilize any remaining core cycles on those cores 202 for their execution even while the dynamic truck threads 206 operating in the first mode of operation are polling, fetching, and processing new tasks, events and other data. However, as mentioned above, such utilization may be severely limited due to the processing resources allocated to the polling function by each of the dynamic truck threads 206 even when the block application has a minimal utilization level.

In illustrative embodiments, in response to a determination that the utilization of the cores 202 is below the predetermined threshold, e.g., 75%, 70%, 60%, or another value, the system manager 210 may command one or more of the dynamic truck threads 206 that are operating in the first mode of operation to instead operate in the second mode of operation. As part of this command, the system manager 210 may also indicate to the remaining dynamic truck threads 206 that are still operating in the first mode of operation that a dynamic truck thread 206 is now operating in the second mode of operation. Responsive to the indication, the dynamic truck threads 206 that are still operating in the first mode of operation will enter the suspended state on their respective cores 202 when there are no tasks, events, or other data that are currently being processed, as described above. This dynamic change improves the ability of other applications to utilize the processing resources of the processing device 108 even when a block application is also utilizing the processing resources. For example, in a situation where the block application is active but currently has a minimal or moderate utilization level, e.g., 60% or some other value, some or all of the dynamic truck threads 206 operating in the first mode of operation will enter the suspended state, freeing up their respective cores 202 for use by the application threads 208 of another application.

In an example, if a processing device 108 initially has ten cores 202 each operating a dynamic truck thread 206 in the first mode of operation, and the system manager 210 determines that the utilization of the cores 202 is below the predetermined threshold, the system manger 210 may command one of the dynamic truck threads 206 to operate in the second mode of operation, leaving nine of the dynamic truck threads 206 operating in the first mode of operation. If the utilization by the block application is at a minimal level, most or all of those dynamic truck threads 206 operating in the first mode of operation will enter the suspended state, thereby freeing up their respective cores 202 for use by application threads 208 of another application.

Where previously the block application utilized, as an example, 50-100% of the processing resources of the ten cores 202 when all of the dynamic truck threads 206 were operating in the first mode of operation, leaving at most 50% and as little as 0% available for use by another application, dynamically changing the execution of one of the dynamic truck threads 206 from the first mode of operation to the second mode of operation potentially allows up to 90% of the processing resources of the processing device 108 to be available for use by the application threads 208 of the other application. For example, when the dynamic truck threads 206 operating in the first mode of operation on the remaining nine cores enter the suspended state while the block application utilization is at a minimal level, up to 90% of the processing resources of the processing device 108 will be available for use by the application threads 108 of the other application while the remaining 10%, e.g., the core executing the dynamic truck thread 206 in the second mode of operation, will be fully utilized by the dynamic truck thread 206 for polling of the interfaces associated with the other dynamic truck threads 206.

In some embodiments, the system manager 210 may randomly select the dynamic truck thread 206 whose mode of execution is to be changed from the first mode of operation to the second mode of operation when the utilization of the cores 202 by the block application is determined to be below the predetermined threshold. In some embodiments, the system manager 210 may alternatively select the dynamic truck thread 206 whose mode of execution is to be changed based at least in part on additional information about the cores 202 on which the dynamic truck threads 206 are operating. For example, in some embodiments, a non-uniform memory access (NUMA) configuration of the cores 202 may be taken into account when choosing which dynamic truck thread 206 to change. For example, a dynamic truck thread 206 that is executing on core 202 from a socket that is directly connected to the memory that is involved in the polling may be preferred or selected by the system manager 210 over a dynamic truck thread 206 executing on a core 202 from a socket that is not directly connected to the memory.

As mentioned above, in a case where a user wishes the full processing resources of the processing device 108 to be available for use by the application threads 208 of the other application, the user may use a host device 102 to instruct the system manager 210 to command the dynamic truck threads 206 executing on the cores 202 of that processing device 108 to operate in the third mode of operation and enter the disabled state. This allows 100%, or close to it, of the processing resources of the processing device 108 to be available for use by the application threads 208 of the other application.

The above described dynamic truck thread functionality allows system manager 210 to dynamically tailor the available processing resources of the cores 202 of a processing device 108 to application utilization patterns of a block application and other applications. For example, as described above, the dynamic truck thread functionality allows the processing resources of a processing device 108 to be fully available, e.g., 100% available, to the block application when the block application is at a maximal utilization of the processing device 108 while also providing increased availability to other applications, e.g., 90% in the example ten core processor described above, when the block application is at a minimal utilization. In addition, where the block application is not actively running, the system manager 210 may dynamically disable the threads of the block application to provide 100% availability, or close to it, to any other application utilizing the processing device.

In some embodiments, the pseudocode below provides an example of how the second mode of operation may be implemented for a dynamic truck thread 206:

```
While (TRUE) {
    For each truck_i operating in the first mode of operation {
        Result = Peek_Front_End_interface(truck_i)
        If (Result == TRUE)
            Wake_Up(truck_i)
        Result = Peek_RPC_Messaging_interface(truck_i)
        If (Result == TRUE)
            Wake_Up(truck_i)
        Result = Peek_RDMA_Messaging_interface(truck_i)
        If (Result == TRUE)
            Wake_Up(truck_i)
        Result = Peek_Back_End_interface(truck_i)
        If (Result == TRUE)
            Wake_Up(truck_i)
    }
}
```

As can be seen from the example pseudocode above, the dynamic truck thread 206 operating in the second mode of operation may poll the interfaces associated with each dynamic truck thread 206 operating in the first mode of operation and if any new tasks, events, or other data is found, will wake up the respective dynamic truck thread 206 from its suspended state. As shown in this example, the dynamic truck thread 206 operating in the second mode of operation in this embodiment does not fetch the detected new tasks, events, or other data for further processing, leaving that fetching and processing to the corresponding dynamic truck threads 206 that are woken up.

The pseudocode below provides an example of how the first mode of operation may be implemented for a dynamic truck thread 206:

```
While (TRUE) {
    /* poll all interfaces and create corresponding tasks */
    Poll_And_Fetch_Front_End_Available_Requests ( )
    Poll_And_Fetch_RPC_Messaging_Events ( )
    Poll_And_Fetch_RDMA_Messaging_Events ( )
    Poll_And_Fetch_Back_End_Completions ( )
    While (has ready tasks) {
        Process ready tasks
    }
    /* reaching here when no tasks at all or all in-flight tasks are waiting.*/
    /*determine whether another dynamic truck thread is operating in the second mode
of operation based on indication from system manager*/
        MODE = obtain_dynamic_truck_thread_mode(indication)
        /* Call Yield( ) to voluntarily release the core until a dynamic truck thread operating
in the second mode of operation wakes up the dynamic truck thread if an indication that there is
another dynamic truck thread operating in the second mode of operation has been received.
        */
        if(MODE==2){
            Yield( )
        }
        /* reaching here after the dynamic truck thread operating in the second mode of
operation detected new events in the interfaces for this dynamic truck thread and wakes this
dynamic truck thread up or if no dynamic truck threads are operating in the second mode of
operation*/
}
```

As can be seen from the above example pseudocode, in an illustrative embodiment, a given dynamic truck thread 206 operating in the first mode of operation polls each corresponding interface, fetches any corresponding tasks, events, or other data, and processes any fetched tasks, events, or other data that are ready for processing. The tasks, events, or other data are processed until no more tasks, events, or other data are ready to be processed. The given dynamic truck thread 206 obtains an indication regarding whether or not another dynamic truck thread 206 is operating in the second mode of operation, e.g., from system manager 210. If the indication indicates that another dynamic truck thread 206 is operating in the second mode of operation, the given dynamic truck thread 206 performs a yield command to release the core 202 until the dynamic truck thread 206 operating in the second mode of operation wakes up the given dynamic truck thread 206. Otherwise, the given dynamic truck thread 206 continues polling each interface, fetching any corresponding tasks, events, or other data, and processing any fetched tasks, events, or other data that are ready.

Figure 4A:
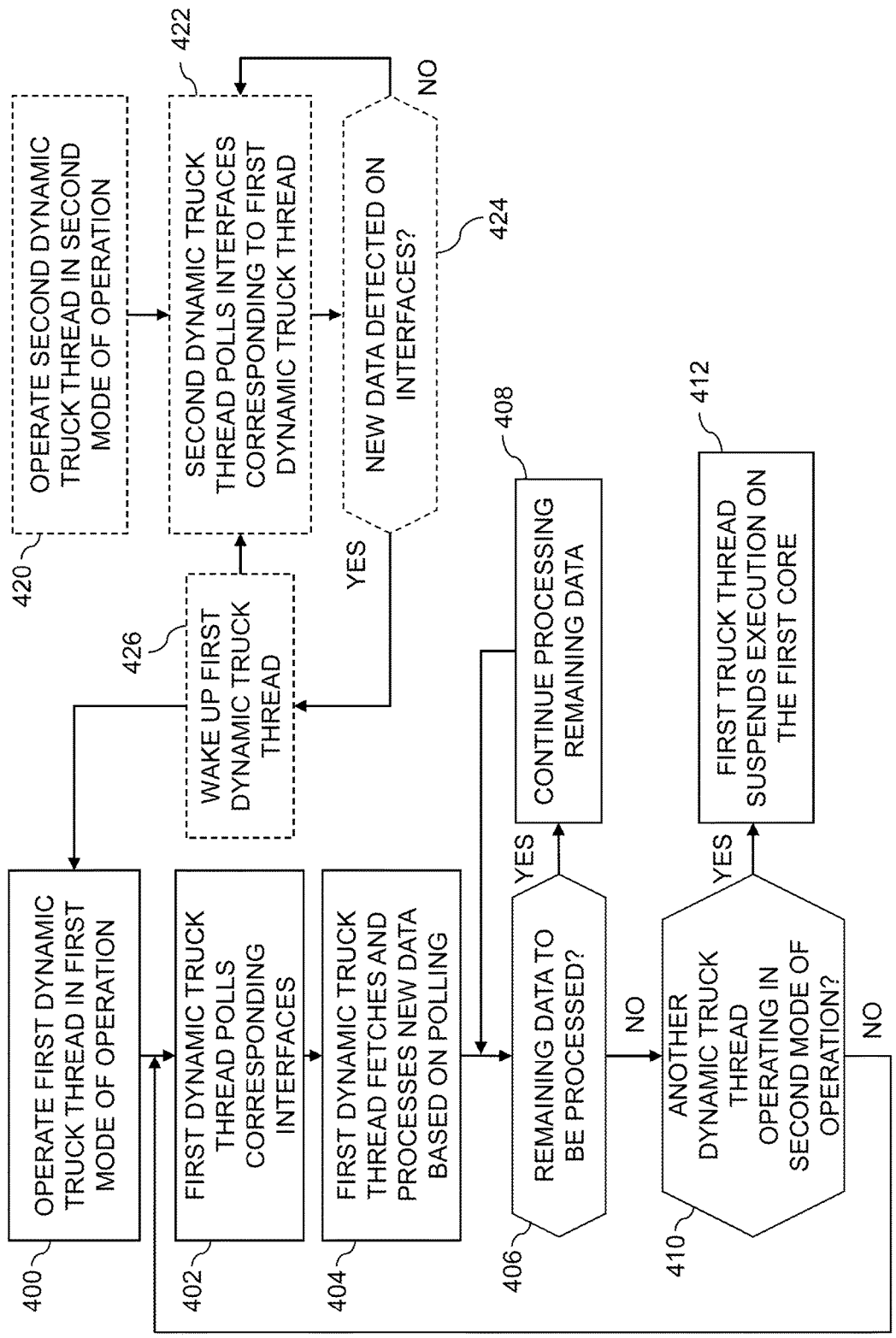
FIG. 4A is a flow diagram of an example process according to the dynamic truck thread functionality in an illustrative embodiment.
Figure 4B:
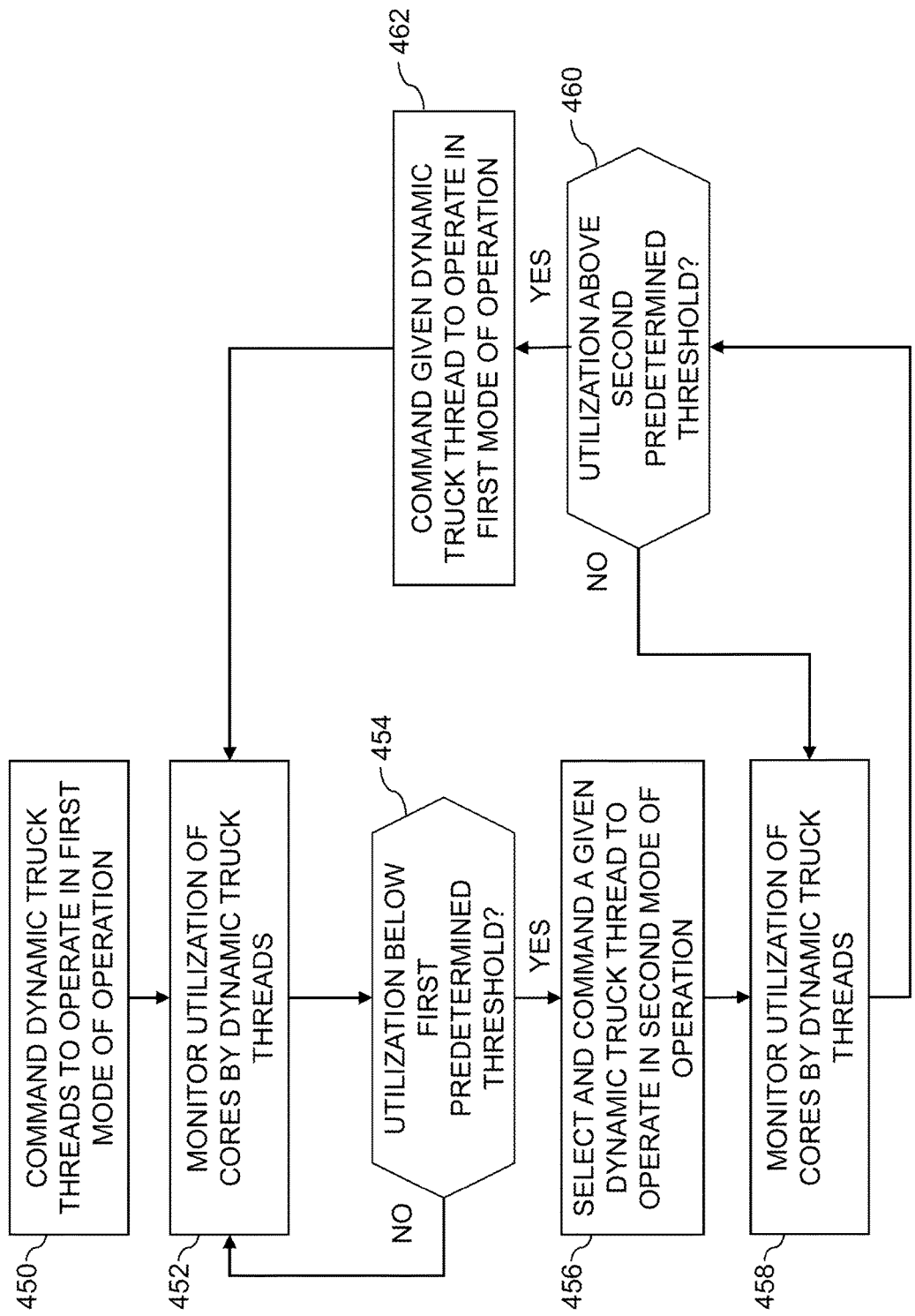
FIG. 4B is a flow diagram of an example process of a system manager according to the dynamic truck thread functionality in an illustrative embodiment.

The operation of the information processing system 100 will now be described in further detail with reference to the flow diagrams of the illustrative embodiments of FIGS. 4A and 4B. The process as shown in FIG. 4A includes steps 400 through 412 and 420 through 426 and the process as shown in FIG. 4B includes steps 450 through 462. The processes shown in FIGS. 4A and 4B are suitable for use in system 100 but are more generally applicable to other types of information processing systems in which a storage system is configured to implement the dynamic truck thread functionality. The steps of FIGS. 4A and 4B are illustratively performed at least in part under the control of one or more processing devices 108 of one or more nodes 106 in storage system 105 of system 100. For example, in some embodiments, the steps of FIG. 4B may be performed by a system manager 210 executing on one of the nodes 106 of the storage system 105. Some or all of the steps may be performed asynchronously where, for example, steps 400 through 412 may be performed by a different thread than the thread that performs steps 420 through 426 which may be performed by a different thread than the thread that performs steps 450 through 462. Steps 400 through 412, 420 through 426, and 450 through 462 and may be performed concurrently with or at any other time relative to the performance of any other of steps 400 through 412, 420 through 426, and 450 through 462. Any other step may also or alternatively be performed asynchronously.

At 400, processing device 108 operates a first dynamic truck thread 206 in a first mode of operation on a first core 202 of the processing device 108. For example, processing device 108 implements a block application comprising dynamic truck threads 206 that are executed on the cores 202 of the processing device 108, as described above.

At 402, the first dynamic truck thread 206 polls its corresponding interfaces for new tasks, events, or other data.

At 404, the first dynamic truck thread 206 fetches and processes any new tasks, events, or other data found on the corresponding interfaces during the polling and proceeds to step 406. Even if no new tasks, events, or other data are found on the corresponding interfaces to be fetched and processed, the method proceeds to step 406.

At 406, the first dynamic truck thread 206 determines whether or not there are any remaining tasks, events, or other data to be processed. For example, if the first dynamic truck thread 206 is still processing one or more of the tasks, events, or other data fetched from the corresponding interfaces, the first dynamic truck thread 206 may determine that there are remaining tasks, events, or other data to be processed and proceed to step 408.

At step 408, the first dynamic truck thread 206 continues processing any remaining tasks. In conjunction with processing the remaining tasks, the first dynamic truck thread 206 also continues determining whether or not there are any remaining tasks, events, or other data to be processed at 406.

Returning now to step 406, if there are no tasks, events, or other data remaining to be processed by the first dynamic truck thread 206 the method may proceed to step 410. For example, if the first dynamic truck thread 206 has no more processing left to do but is waiting for a reply or other indication from one or more of the corresponding interfaces before performing a further action, the given truck thread may determine that there are no tasks, events, or other data remaining to be processed.

At 410, the first dynamic truck thread 206 determines whether another dynamic truck thread is operating in the second mode of operation. For example, if the first dynamic truck thread 206 received an indication from the system manager 210 that another dynamic truck thread is operating in the second mode of operation, the first dynamic truck thread 206 may determine that another dynamic truck thread is operating in the second mode of operation and proceed to step 412. Alternatively, if the first dynamic truck thread 206 received an indication from the system manager 210 that no other dynamic truck threads are operating in the second mode of operation, the first dynamic truck thread 206 may determine that another dynamic truck thread is not operating in the second mode of operation and return to step 402.

At 412, the first dynamic truck thread 206 suspends execution on the first core 202 and enters a suspended or waiting state.

While the first dynamic truck thread 206 is executing steps 400 through 412 or is in the suspended or waiting state, system manager 210 may also command a second dynamic truck thread 206 to execute on a second core 202 of the processing device 108 and operate in the second mode of operation at 420. For example, the second dynamic truck thread 206 may execute in parallel or asynchronously with the execution of the first dynamic truck thread 206. As noted above, in some cases no dynamic truck thread 206 may be operating in the second mode of operation at a given time. Accordingly, steps 420 through 426 are illustrated in dashes lines to indicate that the execution of a second dynamic truck thread 206 in the second mode of operation may or may not be occurring at a given time.

At 422, in the case that the second dynamic truck thread 206 is operating in the second mode of operation on a core 202 of the processing device 108, the second dynamic truck thread 206 polls the interfaces corresponding to any dynamic truck threads 206 executing on the other cores 202 of the processing device 108 including, for example, interfaces corresponding to the first dynamic truck thread 206 executing on the first core 202.

At 424, the second dynamic truck thread 206 determines whether or not there are any new tasks, events, or other data on the interfaces corresponding to the respective dynamic truck threads 206 that need to be processed, e.g., on the interfaces corresponding to the first dynamic truck thread 206. If new tasks, events, or other data are detected on the interfaces, the method proceeds to step 426. If no new tasks, events, or other data are detected, the method returns to step 422 and the second dynamic truck thread 206 continues polling the interfaces of each of the dynamic truck threads 206 executing on the cores 202 of the processing device 108.

At 426, the second dynamic truck thread 206 wakes up any dynamic truck threads 206 that have new tasks, events, or other data on their corresponding interfaces, e.g., the first dynamic truck thread 206 in this example. The first dynamic truck thread 206 then executes steps 400 through 412 until it once again suspends execution, as described above. At 426, the method also returns to step 422 and continues polling the interfaces of each of the dynamic truck threads 206 executing on the cores 202 of the processing device 108.

With reference now to FIG. 4B, an example of the flow of the system manager 210 will now be described with reference to steps 450 through 462.

At 450, system manager 210 commands the dynamic truck threads 206 of a processing device 108 to operate in a first mode of operation. In some embodiments, for example, dynamic truck threads 206 may be commanded by system manager 210 to initially operate in the first mode of operation in response to a system reboot or startup. In some embodiments, system manager 210 may command the dynamic truck threads 206 to operate in the first mode of operation at any time, in response to a user input received from a host device 102, or for any other reason. For example, when a user knows that the block application will require a maximal utilization of the processing device 108 currently or in the near future, the user may instruct the system manager 210 to command the dynamic truck threads 206 of that processing device 108 to operate in the first mode of execution.

At 452, system manager 210 monitors the utilization of the cores 202 by the dynamic truck threads 206. For example, system manager 210 may determine a percentage of utilization of the cores 202, the processing device 108 as a whole, or any other metric to determine the utilization of the cores 202.

At 454, system manager 210 determines based at least in part on the monitoring of step 452 whether or not the utilization of the cores 202 of the processing device 108 is below a first predetermined threshold, e.g., below 60% or some other predetermined value. If the system manager 210 determines that the utilization of the cores 202 of the processing device 108 is not below the first predetermined threshold, the process returns to step 452 and the system manager 210 continues monitoring the utilization of the cores 202 by the dynamic truck threads 206. If the system manager 210 determines that the utilization of the cores 202 of the processing device 108 is below the first predetermined threshold, the process proceeds to step 456.

At 456, system manager 210 selects a given dynamic truck thread 206, e.g., randomly or in another manner as described above, and commands the given dynamic truck thread 206 to operate in the second mode of operation.

At 458, system manager 210 monitors the utilization of the cores 202 by the dynamic truck threads 206 that are operating in the first mode of operation. For example, system manager 210 may determine a percentage of utilization of the cores 202, the processing device 108 as a whole, or any other metric to determine the utilization of the cores 202 by the dynamic truck threads 206 operating in the first mode of operation.

At 460, system manager 210 determines based at least in part on the monitoring of step 458 whether or not the utilization of the cores 202 of the processing device 108 by the dynamic truck threads 206 operating in the first mode of operation is above a second predetermined threshold, e.g., above 80%, 85%, 90%, 95% or some other predetermined value. If the system manager 210 determines that the utilization of the cores 202 of the processing device 108 by the dynamic truck threads 206 operating in the first mode of operation is not above the second predetermined threshold, the process returns to step 458 and the system manager 210 continues monitoring the utilization of the cores 202 by the dynamic truck threads 206 operating in the first mode of operation. If the system manager 210 determines that the utilization of the cores 202 of the processing device 108 by the dynamic truck threads 206 operating in the first mode of operation is above the second predetermined threshold, the process proceeds to step 462.

At 462, system manager 210 commands the given dynamic truck thread 206 to once again operate in the first mode of operation. The process then returns to step 452 with all of the dynamic truck threads 206 operating in the first mode of operation.

At any time during the processes of FIGS. 4A and 4B, system manager 210 may receive an instruction from a host device 102 instructing the system manager 210 to command one or more of the dynamic truck threads 206 executing on the cores 202 of the processing device 108 to operate in the third mode of operation, e.g., to take the necessary steps to stop executing the block application and enter the disabled state. Likewise, at any time while any dynamic truck threads 206 are operating in the third mode of operation, e.g., in the disabled state, system manager 210 may receive an instruction from a host device 102 instructing the system manager 210 to command those dynamic truck threads 206 to resume execution of the block application, e.g., to take the necessary steps to return the dynamic truck threads 206 from the third mode of operation, i.e., the disabled state, to one of the first and second modes of operation.

In some embodiments, the system manager 210 will command the dynamic truck threads 206 to operate in the first mode of operation in response to an instruction to resume execution of the block application.

In some embodiments, the system manager 210 will command the dynamic truck threads 206 to operate in the mode that they were operating in prior to the system manager 210 receiving the instruction to command the dynamic truck threads 206 to operate in the third mode of operation in response to an instruction to resume execution of the block application. For example, if one or more of the dynamic truck threads 206 were operating in the second mode of operation with the remaining dynamic truck threads 206 operating in the first mode of operation when the system manager 210 received the instruction to command the dynamic truck threads 206 to operate in the third mode of operation, the system manager 210 may command those dynamic truck threads 206 to resume operation in those same modes of operation in response to an instruction to resume execution of the block application.

In some embodiments, the dynamic truck thread functionality described above can be implemented in one or more host devices, or partially in a host device and partially in a storage system. Accordingly, illustrative embodiments are not limited to arrangements in which all such functionality is implemented in a storage system or a host device, and therefore encompass various hybrid arrangements in which the functionality is distributed over one or more storage systems and one or more associated host devices, each comprising one or more processing devices.

Functionality such as that described in conjunction with the flow diagrams of FIGS. 4A and 4B can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a storage controller such as a processing device 108 of storage system 105 that is configured to control performance of one or more steps of the processes of FIGS. 4A and 4B in its corresponding system 100 can be implemented as part of what is more generally referred to herein as a processing platform comprising one or more processing devices each comprising a processor coupled to a memory. A given such storage controller may correspond to one or more virtual machines or other types of virtualization infrastructure such as Docker containers or Linux containers (LXCs). The storage controller, as well as other system components, may be implemented at least in part using processing devices 108 of such processing platforms. For example, in a distributed implementation, respective distributed modules of such a storage system 105 can be implemented in respective containers running on respective ones of the processing devices of a processing platform.

In some embodiments, the storage system comprises an XtremIO™ storage array or other type of content addressable storage system suitably modified to incorporate the dynamic truck thread functionality as disclosed herein.

An illustrative embodiment of such a content addressable storage system will now be described with reference to FIG. 5. In this embodiment, a content addressable storage system 505 comprises a plurality of storage devices 506 and an associated storage controller 508. The content addressable storage system 505 may be viewed as a particular implementation of the storage system 105, and accordingly is assumed to be coupled to host devices 102 of computer system 101 via network 104 within information processing system 100.

The storage controller 508 in the present embodiment is configured to implement dynamic truck thread functionality of the type previously described in conjunction with FIGS. 1-3, 4A and 4B.

The storage controller 508 includes one or more processing devices each comprising a plurality of cores, which are configured to operate in a manner similar to that described above for implementing dynamic truck thread functionality by processing devices 108.

Figure 5:
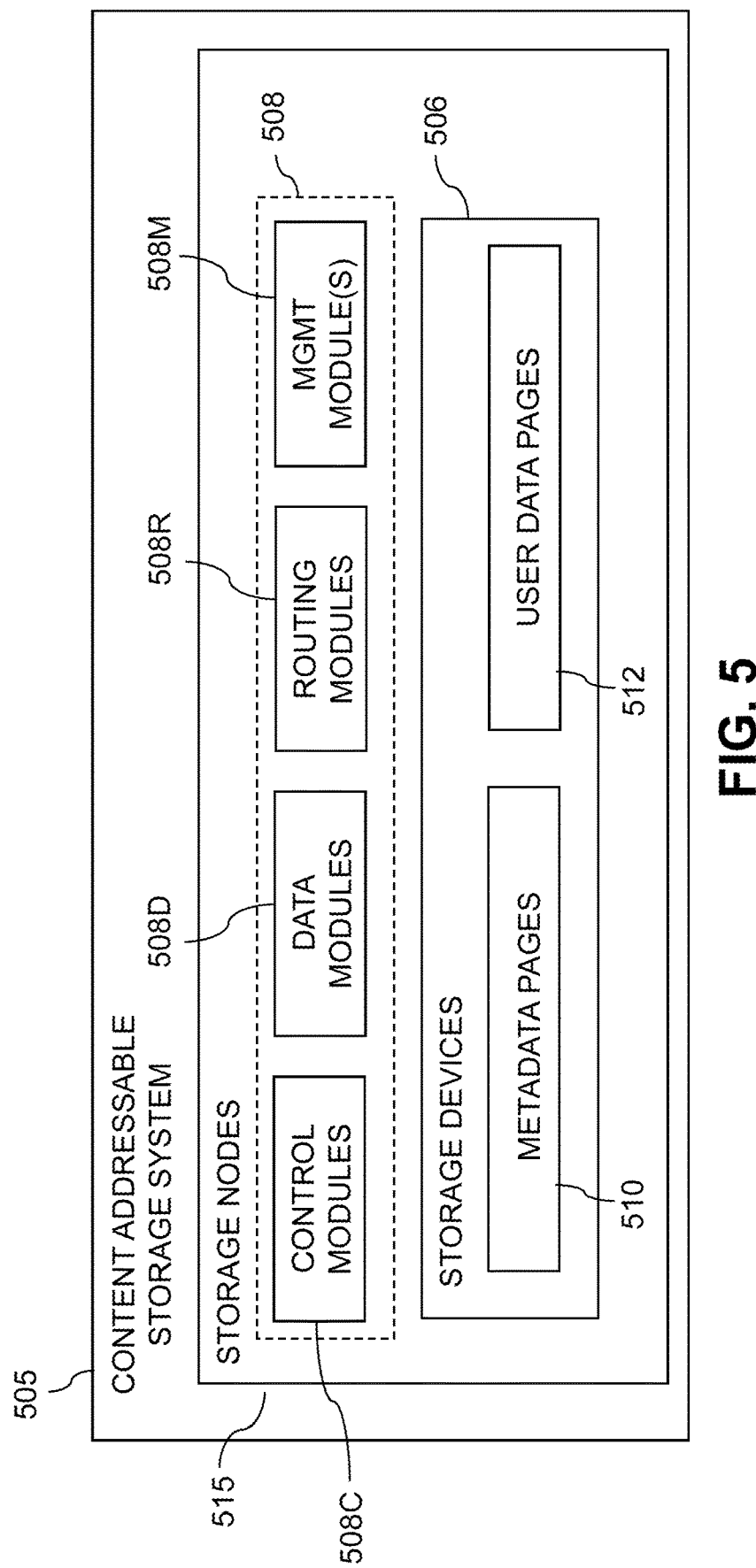
FIG. 5 shows a content addressable storage system having a distributed storage controller configured for implementing the dynamic truck thread functionality in an illustrative embodiment.

The content addressable storage system 505 in the FIG. 5 embodiment is implemented as at least a portion of a clustered storage system and includes a plurality of storage nodes 515 each comprising a corresponding subset of the storage devices 506. Other clustered storage system arrangements comprising multiple storage nodes can be used in other embodiments. A given clustered storage system may include not only storage nodes 515 but also additional storage nodes coupled to network 104. Alternatively, such additional storage nodes may be part of another clustered storage system of the system 100. Each of the storage nodes 515 of the storage system 505 is assumed to be implemented using at least one processing device comprising a processor coupled to a memory.

The storage controller 508 of the content addressable storage system 505 is implemented in a distributed manner so as to comprise a plurality of distributed storage controller components implemented on respective ones of the storage nodes 515. The storage controller 508 is therefore an example of what is more generally referred to herein as a "distributed storage controller." In subsequent description herein, the storage controller 508 may be more particularly referred to as a distributed storage controller.

Each of the storage nodes 515 in this embodiment further comprises a set of processing modules configured to communicate over one or more networks with corresponding sets of processing modules on other ones of the storage nodes 515. The sets of processing modules of the storage nodes 515 collectively comprise at least a portion of the distributed storage controller 508 of the content addressable storage system 505.

The modules of the distributed storage controller 508 in the present embodiment more particularly comprise different sets of processing modules implemented on each of the storage nodes 515. The set of processing modules of each of the storage nodes 515 comprises at least a control module 508C, a data module 508D and a routing module 508R. The distributed storage controller 508 further comprises one or more management ("MGMT") modules 508M. For example, only a single one of the storage nodes 515 may include a management module 508M. It is also possible that management modules 508M may be implemented on each of at least a subset of the storage nodes 515.

Each of the storage nodes 515 of the storage system 505 therefore comprises a set of processing modules configured to communicate over one or more networks with corresponding sets of processing modules on other ones of the storage nodes. A given such set of processing modules implemented on a particular storage node illustratively includes at least one control module 508C, at least one data module 508D and at least one routing module 508R, and possibly a management module 508M. These sets of processing modules of the storage nodes collectively comprise at least a portion of the distributed storage controller 508.

Communication links may be established between the various processing modules of the distributed storage controller 508 using well-known communication protocols such as IP, Transmission Control Protocol (TCP), and remote direct memory access (RDMA). For example, respective sets of IP links used in data transfer and corresponding messaging could be associated with respective different ones of the routing modules 508R.

The storage devices 506 are configured to store metadata pages 510 and user data pages 512 and may also store additional information not explicitly shown such as checkpoints and write journals. The metadata pages 510 and the user data pages 512 are illustratively stored in respective designated metadata and user data areas of the storage devices 506. Accordingly, metadata pages 510 and user data pages 512 may be viewed as corresponding to respective designated metadata and user data areas of the storage devices 506.

A given "page" as the term is broadly used herein should not be viewed as being limited to any particular range of fixed sizes. In some embodiments, a page size of 8-KB is used, but this is by way of example only and can be varied in other embodiments. For example, page sizes of 4-KB, 16-KB or other values can be used. Accordingly, illustrative embodiments can utilize any of a wide variety of alternative paging arrangements for organizing the metadata pages 510 and the user data pages 512.

The user data pages 512 are part of a plurality of logical units (LUNs) or other storage volumes that are configured to store files, blocks, objects or other arrangements of data, each also generally referred to herein as a "data item," on behalf of users associated with host devices 102. Each such LUN may comprise particular ones of the above-noted pages of the user data area. The user data stored in the user data pages 512 can include any type of user data that may be utilized in the system 100. The term "user data" herein is therefore also intended to be broadly construed.

The content addressable storage system 505 in the embodiment of FIG. 5 is configured to generate hash metadata providing a mapping between content-based digests of respective ones of the user data pages 512 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 512. The hash metadata generated by the content addressable storage system 505 is illustratively stored as metadata pages 510 in the metadata area. The generation and storage of the hash metadata is assumed to be performed under the control of the storage controller 508.

Each of the metadata pages 510 characterizes a plurality of the user data pages 512. For example, a given set of user data pages representing a portion of the user data pages 512 illustratively comprises a plurality of user data pages denoted User Data Page 1, User Data Page 2, . . . User Data Page n. Each of the user data pages in this example is characterized by a LUN identifier, an offset and a content-based signature. The content-based signature is generated as a hash function of content of the corresponding user data page. Illustrative hash functions that may be used to generate the content-based signature include the above-noted SHA1 hash function, or other secure hashing algorithms known to those skilled in the art. The content-based signature is utilized to determine the location of the corresponding user data page within the user data area of the storage devices 506.

Each of the metadata pages 510 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 510 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 505 is illustratively distributed among the control modules 508C.

In some embodiments, the content addressable storage system 505 comprises an XtremIO™ storage array suitably modified to incorporate the above described dynamic truck thread functionality.

In arrangements of this type, the control modules 508C, data modules 508D and routing modules 508R of the distributed storage controller 508 illustratively comprise respective C-modules, D-modules and R-modules of the XtremIO™ storage array. The one or more management modules 508M of the distributed storage controller 508 in such arrangements illustratively comprise a system-wide management module ("SYM module") of the XtremIO™ storage array, although other types and arrangements of system-wide management modules can be used in other embodiments. Accordingly, dynamic truck thread functionality in some embodiments is implemented under the control of at least one system-wide management module of the distributed storage controller 508, utilizing the C-modules, D-modules and R-modules of the XtremIO™ storage array.

In the above-described XtremIO™ storage array example, each user data page has a fixed size such as 8-KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein in their entirety.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 508C such that control of the slices within the storage controller 508 of the storage system 505 is substantially evenly distributed over the control modules 508C of the storage controller 508.

The D-module allows a user to locate a given user data page based on its signature. Each metadata page also has a size of 8-KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 505 each illustratively comprise one or more IO operations directing that at least one data item of the storage system 505 be written to in a particular manner. A given write request is illustratively received in the storage system 505 from a host device, illustratively one of the host devices 102. In some embodiments, a write request is received in the distributed storage controller 508 of the storage system 505 and directed from one processing module to another processing module of the distributed storage controller 508. For example, a received write request may be directed from a routing module 508R of the distributed storage controller 508 to a particular control module 508C of the distributed storage controller 508. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO™ context, the C-modules, D-modules and R-modules of the storage nodes 515 communicate with one another over a high-speed internal network such as an InfiniBand network. The C-modules, D-modules and R-modules coordinate with one another to accomplish various IO processing tasks.

The write requests from the host devices identify particular data pages to be written in the storage system 505 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The storage system 505 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the storage system 505.

The first level of mapping using the A2H table associates logical addresses of respective data pages with respective content-based signatures of those data pages. This is also referred to logical layer mapping.

The second level of mapping using the HMD table associates respective ones of the content-based signatures with respective physical storage locations in one or more of the storage devices 506. This is also referred to as physical layer mapping.

For a given write request, both of the corresponding HMD and A2H tables are updated in conjunction with the processing of that write request.

The A2H and HMD tables described above are examples of what are more generally referred to herein as "mapping tables" of respective first and second distinct types. Other types and arrangements of mapping tables or other content-based signature mapping information may be used in other embodiments.

The logical block addresses or LBAs of a logical layer of the storage system 505 correspond to respective physical blocks of a physical layer of the storage system 505. The user data pages of the logical layer are organized by LBA and have reference via respective content-based signatures to particular physical blocks of the physical layer.

Each of the physical blocks has an associated reference count that is maintained within the storage system 505. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 508C, 508D, 508R and 508M as shown in the FIG. 5 embodiment is presented by way of example only. Numerous alternative arrangements of processing modules of a distributed storage controller may be used to implement dynamic truck thread functionality in other embodiments.

Additional examples of content addressable storage functionality implemented in some embodiments by control modules 508C, data modules 508D, routing modules 508R and management module(s) 508M of distributed storage controller 508 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with dynamic truck thread functionality will now be described in greater detail with reference to FIGS. 6 and 7. Although described in the context of system 100, these platforms may also be used to implement at least portions of other information processing systems in other embodiments.

Figure 6:
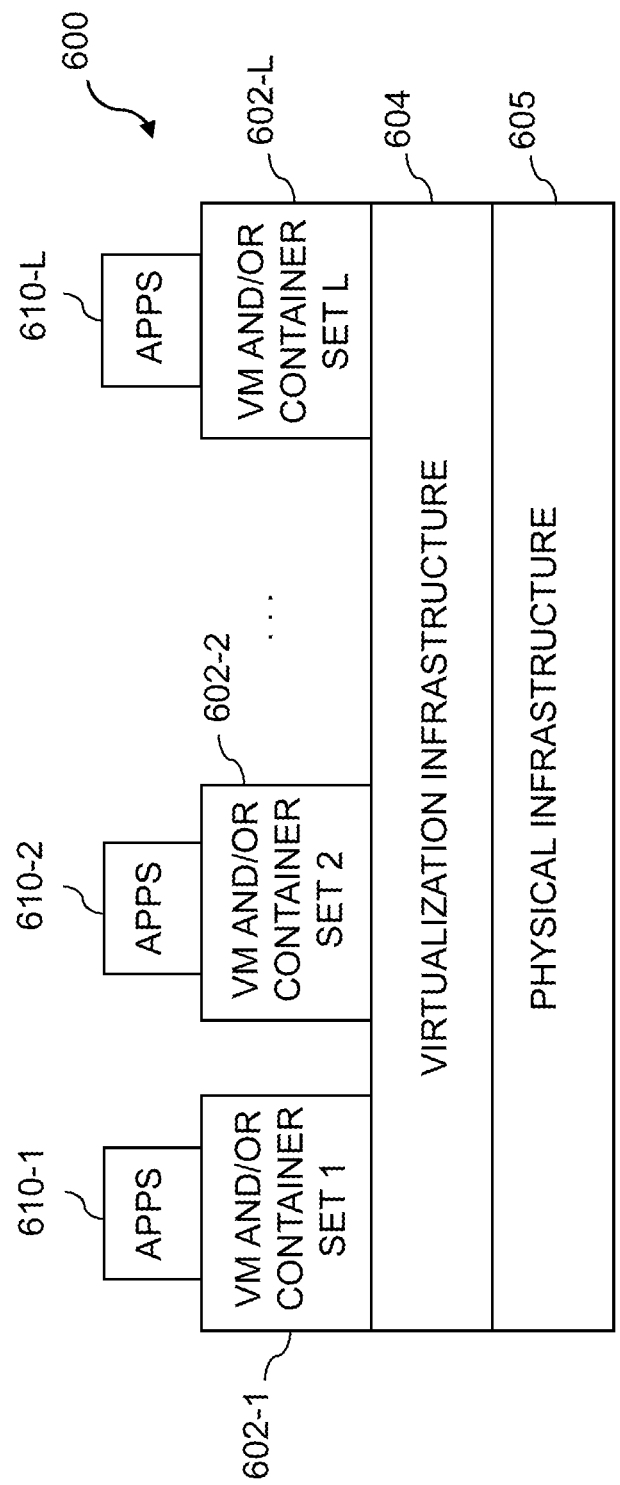
FIGS. 6 and 7 show examples of processing platforms that may be utilized to implement at least a portion of an information processing system in illustrative embodiments.
Figure 7:
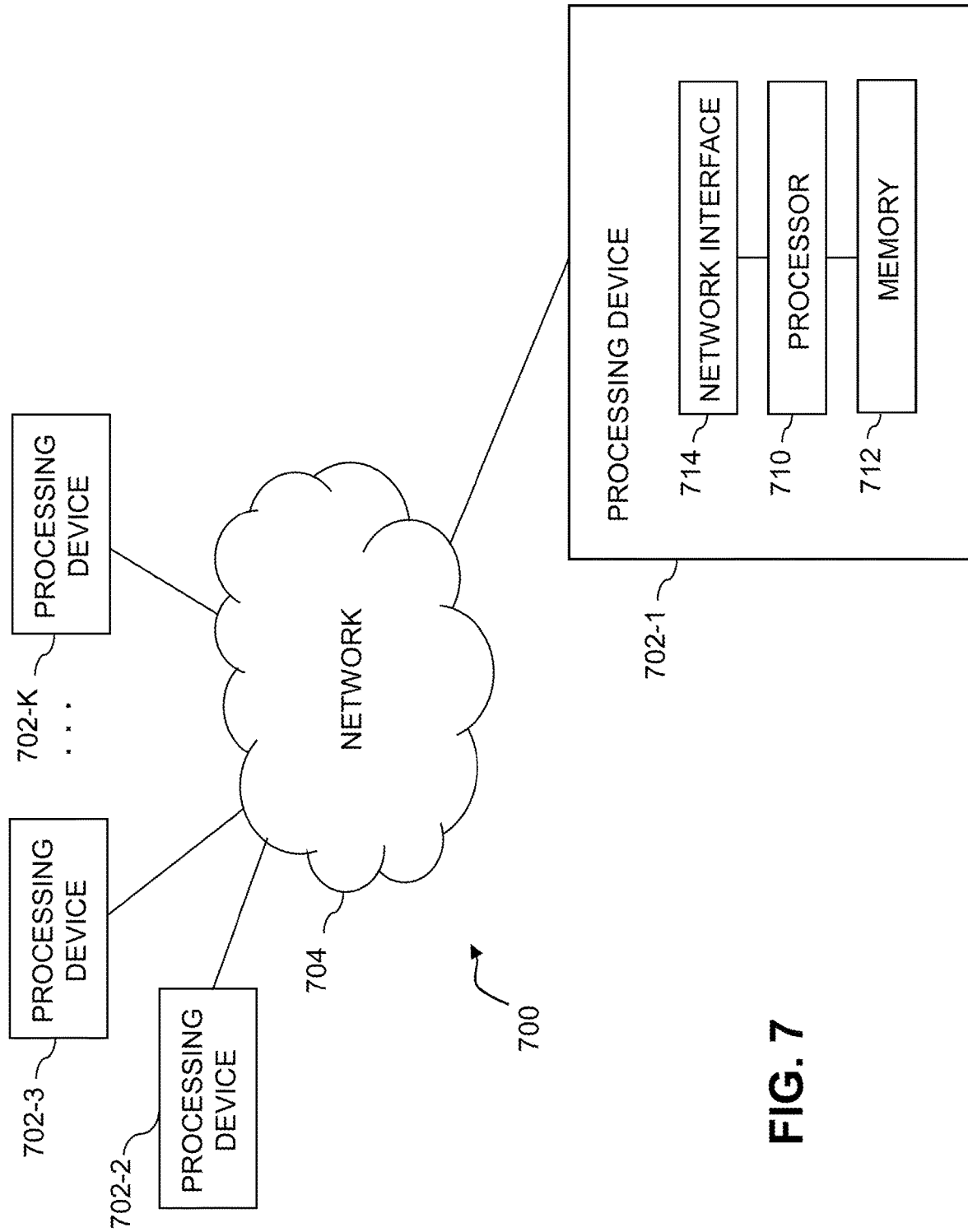

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide dynamic truck thread functionality of the type described above for one or more processes running on a given one of the VMs. For example, each of the VMs can implement dynamic truck thread functionality for providing enhanced core utilization in the system 100.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can also provide dynamic truck thread functionality of the type described above. For example, a container host device supporting multiple containers of one or more container sets can implement one or more cores executing the dynamic truck thread functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the dynamic truck thread functionality of one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, system managers, and dynamic truck thread functionality. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a storage system comprising at least one processing device and a plurality of storage devices, the at least one processing device comprising a plurality of cores, the at least one processing device configured to execute a first thread on a first core of the plurality cores, the first thread configured to operate in a plurality of modes of operation,
the first thread, when operating in a first mode of the plurality of modes of operation, being configured:
to poll at least one interface of the storage system associated with the first thread for an indication of data to be processed by the first thread;
responsive to a detection of an indication of data to be processed by the first thread on the at least one interface associated with the first thread by the polling by the first thread, to process the data based on the indication; and
responsive to the first thread having no remaining data to be processed, to suspend execution on the first core if another thread of the plurality of threads is executing on another core of the plurality of cores and operating in a second mode of the plurality of modes of operation;
the first thread, when operating in the second mode of operation, being configured:
to poll at least one interface of the storage system associated with a second thread operating in the first mode of operation and executing on a second core of the plurality of cores for an indication of data to be processed by the second thread; and responsive to a detection of an indication of data to be processed by the second thread on the at least one interface associated with the second thread by the polling of the first thread, to cause the second thread to resume execution on the second core.

2. The apparatus of claim 1, wherein the first thread, when operating in a third mode of the plurality of modes of operation, is configured to enter a disabled state in which processing resources of the first core are not utilized by the first thread and are available for use by another thread executing on the first core.

3. The apparatus of claim 1, wherein the at least one processing device is configured to execute a plurality of threads on the plurality of cores, each of the plurality of threads executing on a respective core of the plurality of cores, the plurality of threads comprising the first thread executing on the first core and the second thread executing on the second core, each of the plurality of threads being configured to operate in the plurality of modes of operation including at least the first mode of operation and the second mode of operation.

4. The apparatus of claim 3, wherein in conjunction with each of the plurality of threads operating in the first mode of operation, the at least one processing device is configured to determine whether or not the plurality of threads are utilizing the processing resources of their respective cores below a pre-determined threshold of utilization; and in response to determining that the plurality of threads are utilizing the processing resources of their respective cores below the pre-determined threshold of utilization, the at least one processing device is configured to dynamically change the mode of operation of a given thread of the plurality of threads from the first mode of operation to the second mode of operation.

5. The apparatus of claim 4, wherein, in conjunction with dynamically changing the mode of operation of the given thread from the first mode of operation to the second mode of operation, the at least one processing device is configured to indicate to at least one other thread of the plurality of threads that the given thread is operating in the second mode of operation such that responsive to the at least one other thread having no remaining data to be processed, the at least one other thread is configured to suspend execution on its respective core.

6. The apparatus of claim 4, wherein the at least one processing device is configured to select the given thread for dynamically changing the mode of operation from the first mode of operation to the second mode of operation based at least in part on a connection between the respective core of the given thread and a memory associated with the interfaces that are polled by the given thread when operating in the second mode of operation.

7. The apparatus of claim 3, wherein in conjunction with a given thread of the plurality of threads operating in the second mode of operation and at least one other thread of the plurality of threads operating in the first mode of operation, the at least one processing device is configured to determine whether or not the at least one other thread is utilizing the processing resources of its respective core above a pre-determined threshold of utilization; and in response to determining that the at least one other thread is utilizing the processing resources of its respective core above the pre-determined threshold of utilization, the at least one processing device is configured to dynamically change the mode of operation of the given thread from the second mode of operation to the first mode of operation.

8. The apparatus of claim 7, wherein, in conjunction with dynamically changing the mode of operation of the given thread from the second mode of operation to the first mode of operation, the at least one processing device is configured to indicate to the at least one other thread that none of the plurality of threads are executing in the second mode of operation such that responsive to the at least one other thread having no remaining data to be processed, the at least one other thread is configured to continue executing on its respective core and operating in the first mode of operation without suspending execution on its respective core.

9. A method comprising:

executing a first thread on a first core of a plurality cores of at least one processing device of a storage system in a first mode of operation of a plurality of modes of operation, the first thread, when operating in the first mode of operation:

polling at least one interface of the storage system associated with the first thread for an indication of data to be processed by the first thread;

responsive to a detection of an indication of data to be processed by the first thread on the at least one interface associated with the first thread by the polling of the first thread, processing the data based on the indication; and responsive to the first thread having no remaining data to be processed, suspending execution on the first core if another thread is executing on another core of the plurality of cores and operating in a second mode of operation of the plurality of modes of operation; and executing the first thread on the first core in the second mode of operation, the first thread, when operating in the second mode of operation:

polling at least one interface of the storage system associated with a second thread executing on a second core of the plurality of cores and operating in the first mode of operation for an indication of data to be processed by the second thread; and responsive to a detection of an indication of data to be processed by the second thread on the at least one interface associated with the second thread by the polling of the first thread, causing the second thread to resume execution on the second core.

10. The method of claim 9, further comprising operating the first thread in a third mode of operation, the first thread, when operating in the third mode of operation, entering a disabled state in which processing resources of the first core are not utilized by the first thread and are available for use by another thread executing on the first core.

11. The method of claim 9, further comprising executing a plurality of threads on the plurality of cores, each of the plurality of threads executing on a respective core of the plurality of cores, the plurality of threads comprising the first thread executing on the first core and the second thread executing on the second core, each of the plurality of threads being configured to operate in a plurality of modes of operation including at least the first mode of operation and the second mode of operation.

12. The method of claim 11, wherein in conjunction with each of the plurality of threads operating in the first mode of operation, the method further comprises determining whether or not the plurality of threads are utilizing the processing resources of their respective cores below a pre-determined threshold of utilization; and in response to determining that the plurality of threads are utilizing the processing resources of their respective cores below the pre-determined threshold of utilization, the method further comprises dynamically changing the mode of operation of a given thread of the plurality of threads from the first mode of operation to the second mode of operation.

13. The method of claim 12, wherein, in conjunction with dynamically changing the mode of operation of the given thread from the first mode of operation to the second mode of operation, the method further comprises indicating to at least one other thread of the plurality of threads that the given thread is operating in the second mode of operation such that responsive to the at least one other thread having no remaining data to be processed, the at least one other thread is suspends execution on its respective core.

14. The method of claim 11, wherein in conjunction with a given thread of the plurality of threads operating in the second mode of operation and at least one other thread of the plurality of threads operating in the first mode of operation, the method further comprises determining whether or not the at least one other thread is utilizing the processing resources of its respective core above a pre-determined threshold of utilization; and
in response to determining that the at least one other thread is utilizing the processing resources of its respective core above the pre-determined threshold of utilization, the method further comprises dynamically changing the mode of operation of the given thread from the second mode of operation to the first mode of operation.

15. The method of claim 14, wherein, in conjunction with dynamically changing the mode of operation of the given thread from the second mode of operation to the first mode of operation, the method further comprises indicating to the at least one other thread that none of the plurality of threads are operating in the second mode of operation such that responsive to the at least one other thread having no remaining data to be processed, the at least one other thread continues executing on its respective core and operating in the first mode of operation without suspending execution on its respective core.

16. A computer program product comprising a non-transitory processor-readable storage medium having stored therein program code of one or more software programs, wherein the program code when executed by at least one processing device of a storage system, the at least one processing device comprising a plurality of cores, causes the at least one processing device:
to execute a first thread on a first core of the plurality cores in a first mode of operation, the first thread, when operating in the first mode of operation, being configured:
to poll at least one interface of the storage system associated with the first thread for an indication of data to be processed by the first thread;
responsive to a detection of an indication of data to be processed by the first thread on the at least one interface associated with the first thread by the polling by the first thread, to process the data based on the indication; and
responsive to the first thread having no remaining data to be processed, to suspend execution on the first core if another thread of the plurality of threads is executing on another core of the plurality of cores and operating in a second mode of the plurality of modes of operation;
to execute the first thread on the first core in the second mode of operation, the first thread, when operating in the second mode of operation, being configured:
to poll at least one interface of the storage system associated with a second thread operating in the first mode of operation and executing on a second core of the plurality of cores for an indication of data to be processed by the second thread; and
responsive to a detection of an indication of data to be processed by the second thread on the at least one interface associated with the second thread by the polling of the first thread, to cause the second thread to resume execution on the second core.

17. The computer program product of claim 16, wherein the program code further causes the at least one processing device to operate the first thread on the first core in a third mode of operation, the first thread, when operating in the third mode of operation, being configured to enter a disabled state in which processing resources of the first core are not utilized by the first thread and are available for use by another thread executing on the first core.

18. The computer program product of claim 16, wherein the program code further causes the at least one processing device to execute a plurality of threads on the plurality of cores, each of the plurality of threads executing on a respective core of the plurality of cores, the plurality of threads comprising the first thread executing on the first core and the second thread executing on the second core, each of the plurality of threads being configured to operate in the plurality of modes of operation including at least the first mode of operation and the second mode of operation.

19. The computer program product of claim 18, wherein in conjunction with each of the plurality of threads operating in the first mode of operation, the program code further causes the at least one processing device to determine whether or not the plurality of threads are utilizing the processing resources of their respective cores below a pre-determined threshold of utilization;
in response to determining that the plurality of threads are utilizing the processing resources of their respective cores below the pre-determined threshold of utilization, the program code further causes the at least one processing device to dynamically change the mode of operation of a given thread of the plurality of threads from the first mode of operation to the second mode of operation; and
in conjunction with dynamically changing the mode of operation of the given thread from the first mode of operation to the second mode of operation, the program code further causes the at least one processing device to indicate to at least one other thread of the plurality of threads that the given thread is operating in the second mode of operation such that responsive to the at least one other thread having no remaining data to be processed, the at least one other thread is configured to suspend execution on its respective core.

20. The computer program product of claim 18, wherein in conjunction with a given thread of the plurality of threads operating in the second mode of operation and at least one other thread of the plurality of threads operating in the first mode of operation, the program code further causes the at least one processing device to determine whether or not the at least one other thread is utilizing the processing resources of its respective core above a pre-determined threshold of utilization;
in response to determining that the at least one other thread is utilizing the processing resources of its respective core above the pre-determined threshold of utilization, the program code further causes the at least one processing device to dynamically change the mode of operation of the given thread from the second mode of operation to the first mode of operation; and in conjunction with dynamically changing the mode of operation of the given thread from the second mode of operation to the first mode of operation, the program code further causes the at least one processing device to indicate to the at least one other thread that none of the plurality of threads are operating in the second mode of operation such that responsive to the at least one other thread having no remaining data to be processed, the at least one other thread is configured to continue executing on its respective core and operating in the first mode of operation without suspending execution on its respective core.

* * * * *